United States Patent
Lim et al.

(10) Patent No.: US 12,450,324 B2
(45) Date of Patent: Oct. 21, 2025

(54) AUTHENTICATION SERVER FOR PROVIDING SERVICE RELATED TO AUTHENTICATION OF COMPANION ANIMAL AND OPERATION METHOD THEREOF

(71) Applicant: PETNOW INC., Seoul (KR)

(72) Inventors: Joonho Lim, Goyang-si (KR); Daehyun Pak, Seoul (KR)

(73) Assignee: PETNOW INC., Seoul (KR)

( * ) Notice: Subject to any disclaimer, the term of this patent is extended or adjusted under 35 U.S.C. 154(b) by 0 days.

(21) Appl. No.: 18/946,848

(22) Filed: Nov. 13, 2024

(65) Prior Publication Data

US 2025/0190531 A1    Jun. 12, 2025

(30) Foreign Application Priority Data

Dec. 7, 2023   (KR) ........................ 10-2023-0177053

(51) Int. Cl.
   *G06F 21/00*   (2013.01)
   *G06F 21/32*   (2013.01)
   *G06V 40/16*   (2022.01)

(52) U.S. Cl.
   CPC ............ *G06F 21/32* (2013.01); *G06V 40/172* (2022.01); *G06V 2201/07* (2022.01)

(58) Field of Classification Search
   CPC ... G06F 21/32; G06V 40/172; G06V 2201/07
   See application file for complete search history.

(56) References Cited

U.S. PATENT DOCUMENTS

| | | | | |
|---|---|---|---|---|
| 2004/0208343 | A1* | 10/2004 | Golden | A61B 3/145 382/110 |
| 2012/0323805 | A1* | 12/2012 | Udani | G16H 70/20 705/317 |
| 2020/0159720 | A1* | 5/2020 | Leong | G06F 16/2365 |
| 2021/0166306 | A1 | 6/2021 | Lee et al. | |
| 2022/0406155 | A1* | 12/2022 | Doogan | H04L 9/0891 |

FOREIGN PATENT DOCUMENTS

| KR | 1020060026623 | 3/2006 |
|---|---|---|
| KR | 10-1775650 | 8/2017 |
| KR | 101903377 | 9/2018 |

(Continued)

OTHER PUBLICATIONS

Notice of Allowance from Korean Intellectual Patent Office dated on Jul. 18, 2024.

*Primary Examiner* — William A Corum, Jr.

(57) ABSTRACT

Provided is a system for providing a service related to authentication of a companion animal, capable of verifying the identity of a companion animal and whether the companion animal has visited a facility. An operation method of an authentication server in the system for providing a service related to authentication of a companion animal includes: receiving biometric image data related to biometric information of a companion animal from a user device; determining a location of the user device from the biometric image data; confirming a visit to a facility of the companion animal based on the biometric information of the companion animal and the location of the user device; and storing information about the visit to the facility of the companion animal.

7 Claims, 23 Drawing Sheets

(56) References Cited

FOREIGN PATENT DOCUMENTS

| KR | 10-2019-0142889 | 12/2019 |
| KR | 10-2020-0024643 | 3/2020 |
| KR | 10-2020-0107506 | 9/2020 |
| KR | 10-2021-0017753 | 2/2021 |
| KR | 10-2341749 | 12/2021 |

\* cited by examiner

FIG. 6A

DOG PROFILE REGISTRATION

PROFILE PICTURE — 605

NAME

NAU — 610

BREED

WELSH CORGI — 615

SEX

FEMALE    MALE

☑ NEUTERED/SPAYED — 620

BIRTHDATE

MARCH 27, 2020 — 625

NEXT — 630

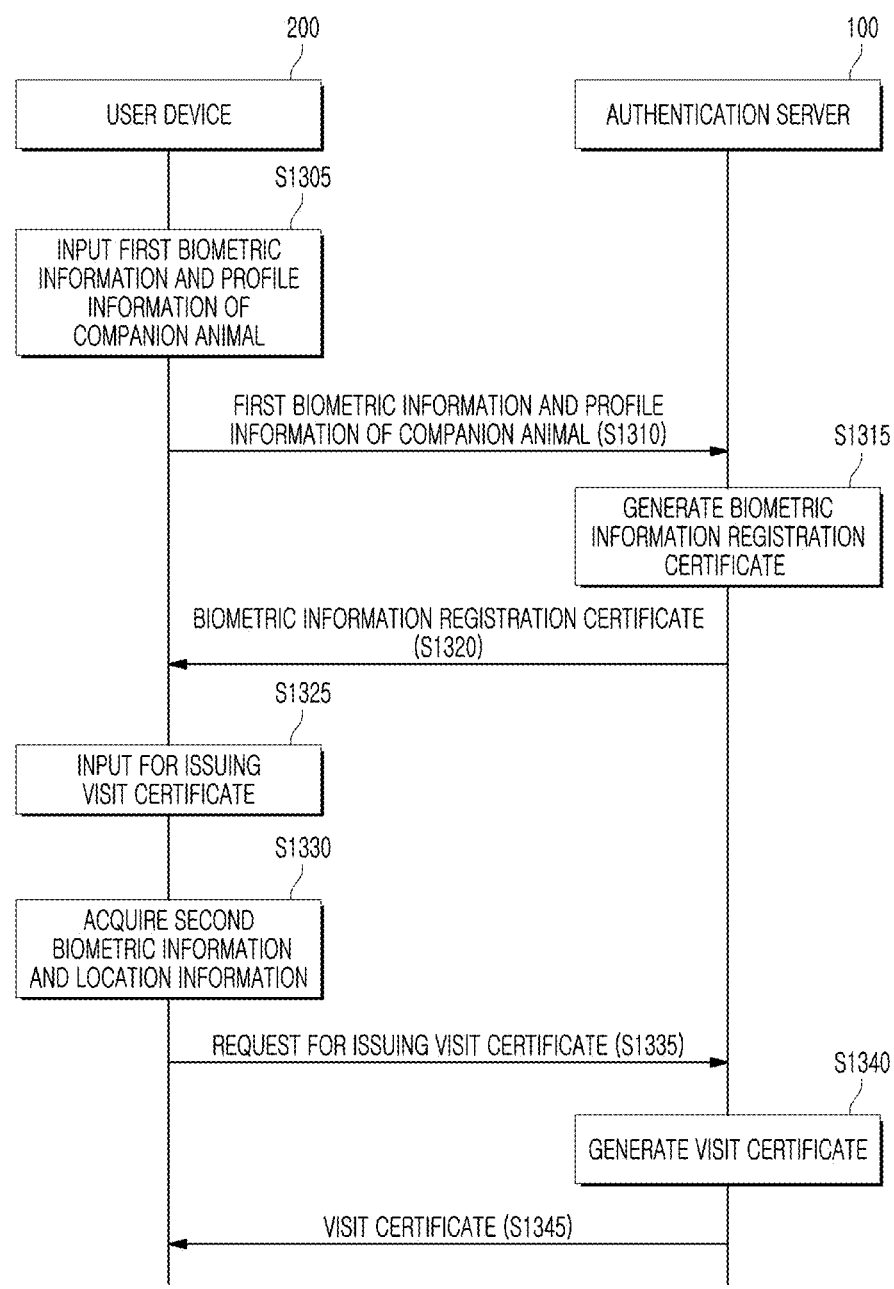

AUTHENTICATION SERVER FOR PROVIDING SERVICE RELATED TO AUTHENTICATION OF COMPANION ANIMAL AND OPERATION METHOD THEREOF

CROSS-REFERENCE TO RELATED APPLICATION

This application claims priority to and the benefit of Korean Patent Application No. 10-2003-0177053, filed on Dec. 7, 2023, the disclosure of which is herein incorporated by reference in its entirety.

BACKGROUND

1. Field of the Invention

The present invention relates to an authentication server for providing a service related to authentication of a companion animal and an operation method of the authentication server.

2. Discussion of Related Art

In modern society, the demand for companion animals, which people may emotionally rely on while living together, is increasing. The population of those living with companion animals continues to grow, and the companion animal-related industry is also on the rise. A representative example is a facility such as a pet hospital that provides medical care and health-related services for companion animals. However, in the case of pet hospitals, unlike for humans, pet insurance is not widely used, and the subscription rate of pet insurance is low.

One of the reasons for the low subscription rate of pet insurance is that it is difficult for insurance companies to verify whether an insured animal has received medical care at a hospital. In other words, it needs to be verified whether an insured animal has actually visited a pet hospital, but since there is no method of confirming the identity of a companion animal and whether it has visited the hospital, there is a high possibility of fraudulent claims related to pet insurance.

SUMMARY OF THE INVENTION

The present invention is directed to providing an authentication server for providing a service related to authentication of a companion animal that is capable of authenticating the identity of a companion animal and whether the companion animal has visited a facility, and an operation method of the authentication server.

The technical objectives of the present invention are not limited to the above, and other objectives that are not described above may become apparent to those of ordinary skill in the art based on the following descriptions.

According to an aspect of the present invention, there is provided an operation method of an authentication server in a system for providing a service related to authentication of a companion animal, which includes: receiving biometric image data related to biometric information of a companion animal from a user device; determining a location of the user device from the biometric image data; confirming a visit to a facility of the companion animal based on the biometric information of the companion animal and the location of the user device; and storing information about the visit to the facility of the companion animal.

The biometric image data may include an image including an object representing the biometric information of the companion animal, capturing time information of the image, and capturing location information of the image.

The object representing the biometric information of the companion animal included in the image may include a nose area or a face area of the companion animal.

The confirming of the visit to the facility of the companion animal may include: identifying an identity of the companion animal from the biometric information of the companion animal; determining whether the capturing location information of the image corresponds to a location of the facility; and confirming that the companion animal has visited the facility when the capturing location information corresponds to the location of the facility.

The operation method may further include: generating a visit certificate proving that the companion animal has visited the facility based on information about the visit to the facility of the companion animal; and transmitting the visit certificate to the user device.

The confirming of the visit to the facility of the companion animal may include: detecting an object related to the facility from the biometric image data or image data including a process of acquiring the biometric information; and verifying whether the companion animal has visited the facility based on the object related to the facility.

According to an aspect of the present invention, there is provided an operation method of an authentication server in a system for providing a service related to authentication of a companion animal, which includes: receiving first biometric information and profile information of a companion animal from a user device; generating a biometric information registration certificate including a biometric information registration number of the companion animal based on the first biometric information and the profile information of the companion animal; transmitting the biometric information registration certificate to the user device; receiving authentication information of the companion animal acquired from the user device and a request for issuing a visit certificate from the user device; generating the visit certificate based on the authentication information of the companion animal; and transmitting the visit certificate to the user device.

The authentication information of the companion animal may include second biometric information of the companion animal, acquisition time information of the second biometric information, and location information of the user device.

The receiving of the request for issuing a visit certificate may include: transmitting a request for access to the location information of the user device; when the request for access is approved, receiving the location information of the user device; receiving an image of a feature object corresponding to the second biometric information from the user device; and recording a time at which the second biometric information is acquired as the acquisition time information of the second biometric information.

The generating of the visit certificate may include: verifying validity of the request for issuing a visit certificate based on the second biometric information of the companion animal and the location information of the user device; and generating a visit certificate corresponding to the request for issuing a visit certificate when the request for issuing a visit certificate is determined to be valid.

The verifying of validity of the request for issuing a visit certificate may include: checking facility visit information including a facility visit time and facility information from the user device; determining whether a first matching condition regarding whether the second biometric information matches the first biometric information is satisfied; determining whether a second matching condition regarding whether the location information of the user device corresponds to a facility location is satisfied; determining whether a third matching condition regarding whether the acquisition time information of the second biometric information falls within a reference range from the facility visit time is satisfied; and determining that the request for issuing a visit certificate is valid when all of the first matching condition, the second matching condition, and the third matching condition are satisfied.

According to an aspect of the present invention, there is provided an operation method of an authentication server in a system for providing a service related to authentication of a companion animal, which includes: receiving image data of a companion animal from a user device; receiving payment history data including payment information from the user device; confirming a visit to a facility of the companion animal based on the image data and the payment history data; and storing information about the visit to the facility of the companion animal.

The confirming of the visit to the facility of the companion animal may include: determining whether the payment information included in the payment history data matches capturing information of the image data; and verifying that the companion animal has visited the facility when the payment information matches the capturing information.

The determining of whether the payment information matches the capturing information may include: determining whether a facility location included in the payment information matches capturing location information; and determining whether a payment time included in the payment information matches a capturing time included in the capturing information.

The capturing location information may be acquired from metadata linked to the image data or extracted from an object included in a frame image of the image data.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which:

FIGS. 6A to 6C illustrate an example of screens displayed on a user device in a process of registering profile information of a companion animal;

FIG. 13 is a flowchart showing operations between a user device and an authentication server in a system for providing a service related to authentication of a companion animal;

DETAILED DESCRIPTION OF EXEMPLARY EMBODIMENTS

Figure 1:
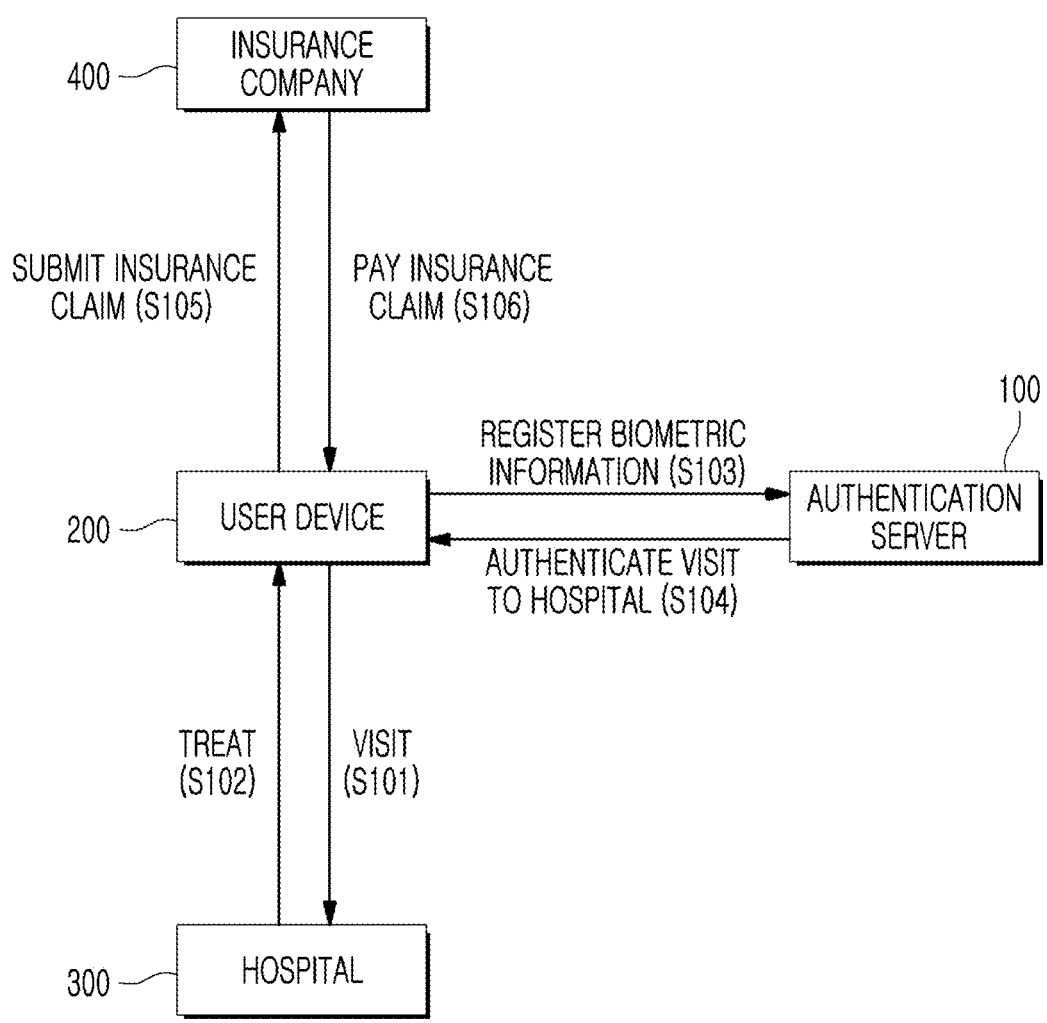
FIG. 1 illustrates a system for providing a service related to authentication of a companion animal.

Hereinafter, embodiments of the present invention will be described in detail with reference to the accompanying drawings so that those of ordinary skill in the art can easily implement the present invention. However, the present invention may be implemented in various different forms and is not limited to the embodiments described herein.

In the drawings, parts irrelevant to the description are omitted in order to clearly describe the present invention, and similar reference numerals are attached to similar parts throughout the specification.

In addition, in various embodiments, components having the same configuration will be described only in representative embodiments by using the same reference numerals, and in other embodiments, only configurations different from the representative embodiments will be described.

Throughout the specification, when a part is said to be "connected (or coupled)" to another part, this includes not only "directly connected" but also "indirectly connected (or coupled)" with another element interposed therebetween. In addition, when a part "includes" a certain component, it does not mean that other components are excluded and other components or one or more other features may be further included unless specifically stated to the contrary.

Unless otherwise defined, all terms (including technical and scientific terms) used herein have the same meaning as commonly understood by those of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a system for providing a service related to authentication of a companion animal, an authentication server, and an operation method of the authentication server according to the present invention will be described. Biometric information of a companion animal is acquired to verify the identity of the companion animal. The biometric information of the companion animal may include the pattern of nose wrinkles (a nose print), a facial shape, a body shape, an iris, etc. This document is described in relation to capturing an image of a nose print of a dog as biometric information of a companion animal, but the scope of companion animals in the present invention is not limited to dogs and cats. Furthermore, features used as identification information are not limited to nose prints, and various physical characteristics of companion animals may be used. In this document, a facility is an entity that provides services for companion animals, such as an animal hospital.

FIG. 1 illustrates a system for providing a service related to authentication of a companion animal. Referring to FIG. 1, the system for providing a service related to authentication of a companion animal includes a user device 200 used by an owner of a companion animal, and an authentication server 100 that provides the user device 200 with biometric authentication and a visit certificate of the companion animal.

Referring to FIG. 1, a user visits a facility 300 (S101) and has his/her companion animal treated at the facility (S102). The user registers biometric information of the companion animal with an authentication server 100 through the user device 200 (S103), and the authentication server 100 provides authentication to the user device 200 on whether a visit to the facility has been made by authenticating the identity of the companion animal (S104). The user submits an insurance claim to an insurance company 400 after attaching information or a visit certificate that authenticates the visit to the facility together with medical records at the facility 300 (S105), and the insurance company 400 may verify details of the claim through the medical records and the visit certificate and pay the insurance claim (S106).

The user device 200 is an electronic device that is carried and used by the owner of the companion animal. The user device 200 may be a portable electronic device, such as a smartphone, a tablet device, or a laptop computer. In addition, the user device 200 may be a wearable device, such as a smart watch or smart glasses. The user device 200 may be an electronic device, such as a personal computer PC or a game console. The user device 200 may be an electronic device having a processor, a memory, a display, and a communication module, and that is capable of executing an application program for biometric recognition of a companion animal.

Figure 2:
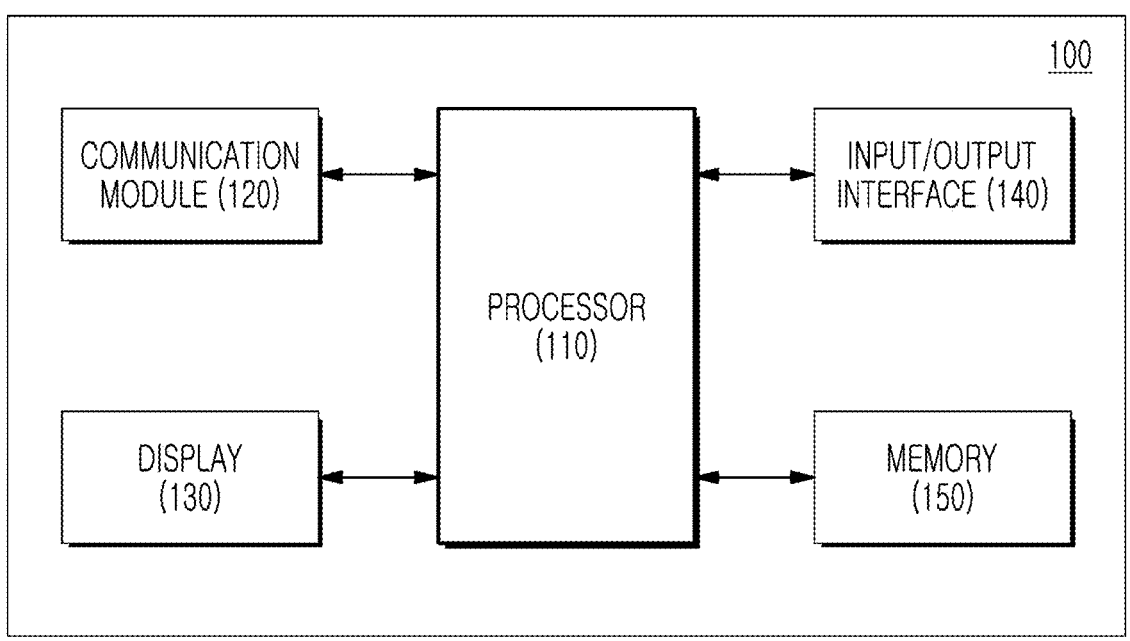
FIG. 2 is a block diagram illustrating the configuration of an authentication server.

FIG. 2 is a block diagram illustrating the configuration of an authentication server 100. In a system for providing a service related to authentication of a companion animal according to the present invention, the authentication server 100 includes a communication module 120 for transmitting or receiving data to or from a user device 200, a processor 110 electrically coupled to the communication module 120, and a memory 150 electrically coupled to the processor 110. Optionally, the authentication server 100 may include a display 130 for visually outputting information and an input/output interface 140 for connection with other devices or information input and output.

The processor 110 may perform operations and data processing for performing operations of the authentication server 100, and control each module of the authentication server 100. The processor 110 may execute one or more software programs stored in the memory 150. The processor 110 may include a general-purpose processor (e.g., a central processing unit: CPU) for executing an operating system that manages the overall operation of the authentication server 100. In addition, the processor 110 may include a dedicated processor (e.g., a graphics processing unit (GPU) or a neural processing unit (NPU)), for specific operation processing. The processor 110 may include one or more processing circuits. An operation method of the authentication server 100 described below may be executed by the processor 110.

The communication module 120 provides an environment in which communication between the authentication server 100 and an external entity (e.g., an authentication server, a base station, an Internet of Things (IoT) device, or a user device 200) may be performed. The communication module 120 may include a device for performing wired or wireless communication. The communication module 120 may provide data received from an external entity to the processor 110. The communication module 120 may convert data provided from the processor 110 and transmit the converted data to the external entity.

The display 130 is a device that outputs visual information and may include a panel and a control circuit. The memory 150 may store programs, such as an operating system and applications for the operation of the authentication server 100, and data used in a process of executing the programs. The memory 150 may include a volatile memory (e.g., a dynamic random access memory (DRAM)) and a nonvolatile memory (e.g., a flash memory). In addition, the memory 150 may include a large-capacity storage device for building a database.

Figure 3:
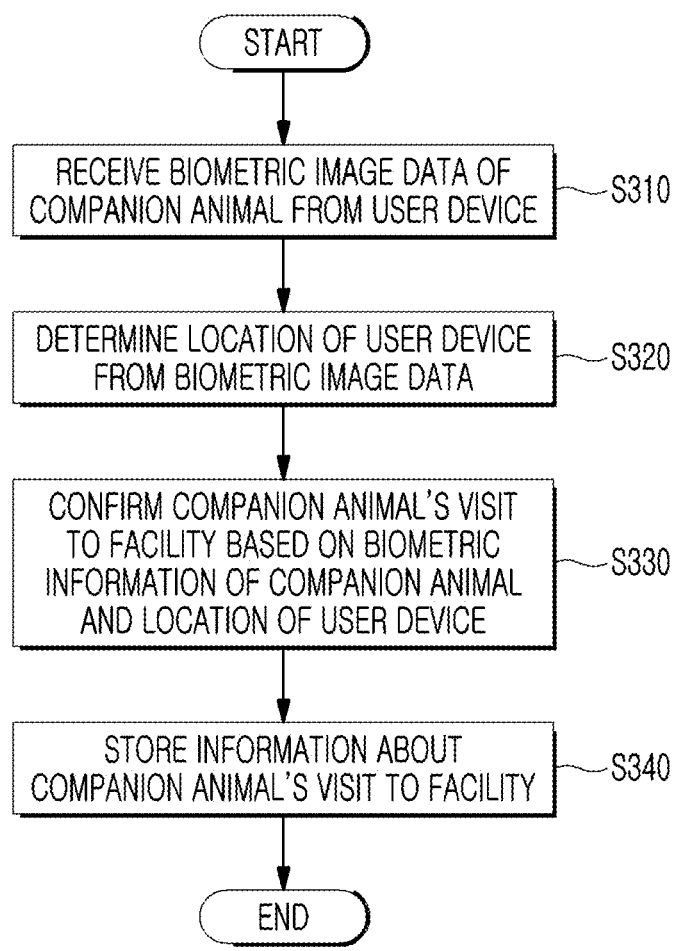
FIG. 3 is a flowchart showing an operation method of an authentication server according to a first embodiment in a system for providing a service related to authentication of a companion animal.

FIG. 3 is a flowchart showing an operation method of an authentication server 100 according to a first embodiment in a system for providing a service related to authentication of a companion animal. The operation method of the authentication server 100 in the system for providing a service related to authentication of a companion animal according to the present invention includes receiving biometric image data related to biometric information of a companion animal from a user device 200 (S310), determining a location of the user device 200 from the biometric image data (S320), confirming a visit to a facility of the companion animal based on the biometric information of the companion animal and the location of the user device 200 (S330), and storing information about the visit to the facility of the companion animal (S340).

In operation S310, the processor 110 receives biometric image data related to biometric information of a companion animal from the user device 200 through the communication module 120. The biometric image data may include an image including an object representing biometric information of the companion animal, capturing time information of the image, and capturing location information of the image. The image data may be configured by linking the image including the object representing the biometric information of the companion animal, along with the capturing time information and the capturing location information of the image. The object representing the biometric information of the companion animal included in the image may include a nose area or a face area of the companion animal. The user device 200 may transmit biometric image data to the authentication server 100 to authenticate a visit to a facility of the companion animal. The user device 200 may capture an image for biometric authentication of the companion animal and transmit the captured image to the authentication server 100. Capturing time information and capturing location information are transmitted to the authentication server 100 along with the image of the companion animal.

In operation S320, the processor 110 determines the location of the user device 200 from the biometric image data. The processor 110 may specify the location (e.g., an address) at which the image was captured from the capturing location information (e.g., coordinate information) included in the biometric image data.

Figure 4:
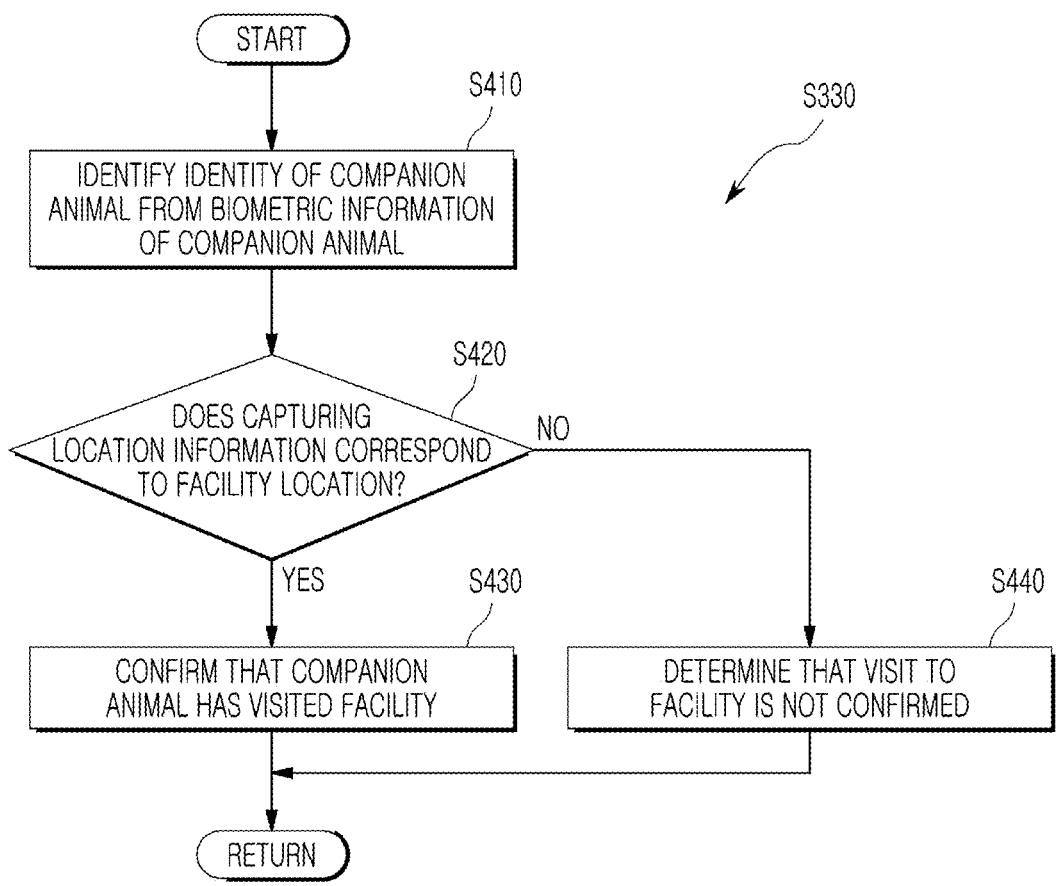
FIG. 4 is a flowchart showing an example of a process of confirming a visit to a facility of a companion animal.

In operation S330, the processor 110 identifies a visit to the facility of the companion animal based on the biometric information of the companion animal and the location of the user device 200. FIG. 4 is a flowchart showing an example of a process of confirming a visit to a facility of a companion animal. Referring to FIG. 4, operation S330 of confirming a visit to the facility of the companion animal based on the biometric information of the companion animal and the location of the user device 200 includes identifying the identity of the companion animal from the biometric information of the companion animal (S410), determining whether the capturing location information of the image corresponds to the facility location (S420), and confirming that the companion animal has visited the facility when the capturing location information corresponds to the facility location (S430).

In operation S410, the processor 110 identifies the identity of the companion animal from the biometric information of the companion animal. The processor 110 specifies an animal that matches the received biometric information of the companion animal among animals whose biometric information is registered in a database. The processor 110 may identify the identity of the companion animal through identity information of the animal having biometric information that matches the received biometric information.

In operation S420, the processor 110 determines whether the capturing location information of the image corresponds to the facility location. The processor 110 may determine whether the capturing location information (e.g., coordinates) received together with the image corresponds to the facility location. The processor 110 may determine that the capturing location corresponds to the facility location when the capturing location is within a predetermined range from the location of the facility. The processor 110 confirms that the companion animal has visited the facility when the capturing location of the image corresponds to the facility location (S430), and determines that the visit to the facility is not confirmed and processes the companion animal's visit to the facility as not being authenticated when the capturing location of the image does not correspond to the facility location (S440).

In one embodiment, operation S430 of confirming the visit to the facility of the companion animal includes detecting an object related to the facility from the biometric image data or image data in which a process of acquiring the biometric information is included, and verifying whether the companion animal has visited the facility based on the object related to the facility. The processor 110 may acquire information about a surrounding environment in which the companion animal is located from each frame of the biometric image data including the biometric information (e.g., a nose print and a face) of the companion animal. That is, the processor 110 may analyze the image using a deep neural network to determine a place in which the companion animal is currently located. The processor 110 may detect one or more objects located around the companion animal from each frame of the biometric image data. The processor 110 may identify the detected objects. The processor 110 may detect an object located at a hospital among the objects detected around the companion animal in each frame, thereby determining that the companion animal is located at the hospital. For example, when text such as "hospital," "treatment," or "hospitalization" is detected in the frame, the processor 110 may determine that the companion animal is located in the hospital. Alternatively, when a person wearing a doctor's or nurse's uniform is detected in the frame, or a medical device is detected, the processor 110 may determine that the companion animal is located in the hospital.

When it is confirmed that the companion animal has visited the facility, the processor 110 proceeds to operation S340 of FIG. 3 and stores information about the companion animal's visit to the facility in the memory 150 or the database. When the companion animal's visit to the facility is authenticated, the processor 110 may store information indicating that the companion animal has visited a specific facility and transmit information (e.g., a visit certificate) authenticating the companion animal's visit to the facility to the user device 200 or an authentication server of the insurance company 400. Thus, the authentication server of the insurance company 400 may identify that the companion animal has visited the facility and perform insurance processing. The embodiment described with reference to FIGS. 3 and 4 is an embodiment in which an image including biometric information of a companion animal and metadata (a capturing time and a capturing location) attached to the image are used to verify whether the companion animal has visited a facility. Hereinafter, FIGS. 5 to 13 concern an embodiment in which biometric information of a companion animal is received in advance, and location information is acquired from a user device 200 together with biometric information of the companion animal to authenticate whether the companion animal has visited a facility.

Figure 5:
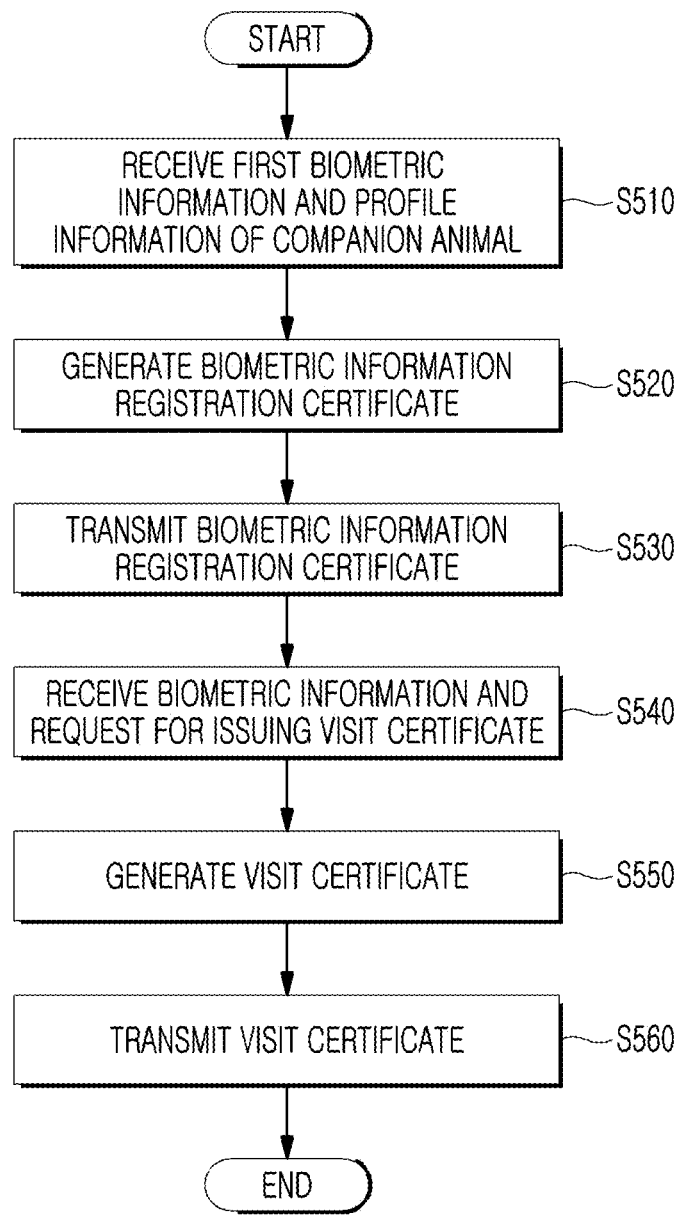
FIG. 5 is a flowchart showing an operation method of an authentication server according to a second embodiment in a system for providing a service related to authentication of a companion animal.

FIG. 5 is a flowchart showing an operation method of an authentication server 100 according to a second embodiment in a system for providing a service related to authentication of a companion animal. In a system for providing a service related to authentication of a companion animal, an operation method of an authentication server 100 includes receiving first biometric information and profile information of a companion animal from a user device 200 (S510), generating a biometric information registration certificate including a unique identification number of the companion animal based on the first biometric information and the profile information of the companion animal (S520), transmitting the biometric information registration certificate to the user device (S530), receiving authentication information of the companion animal acquired from the user device 200 and a request for issuing a visit certificate (S540), generating the visit certificate based on the authentication information of the companion animal (S550), and transmitting the visit certificate to the user device (S560).

In operation S510, the processor 110 receives first biometric information and profile information of a companion animal from the user device 200 through the communication module 120. The user may run an application program for biometric authentication of a companion animal on the user device 200 and input biometric information and profile information of the companion animal through the application program. That is, the user device 200 receives the biometric information and the profile information of the companion animal through the application program for biometric authentication of the companion animal.

Figure 6B:
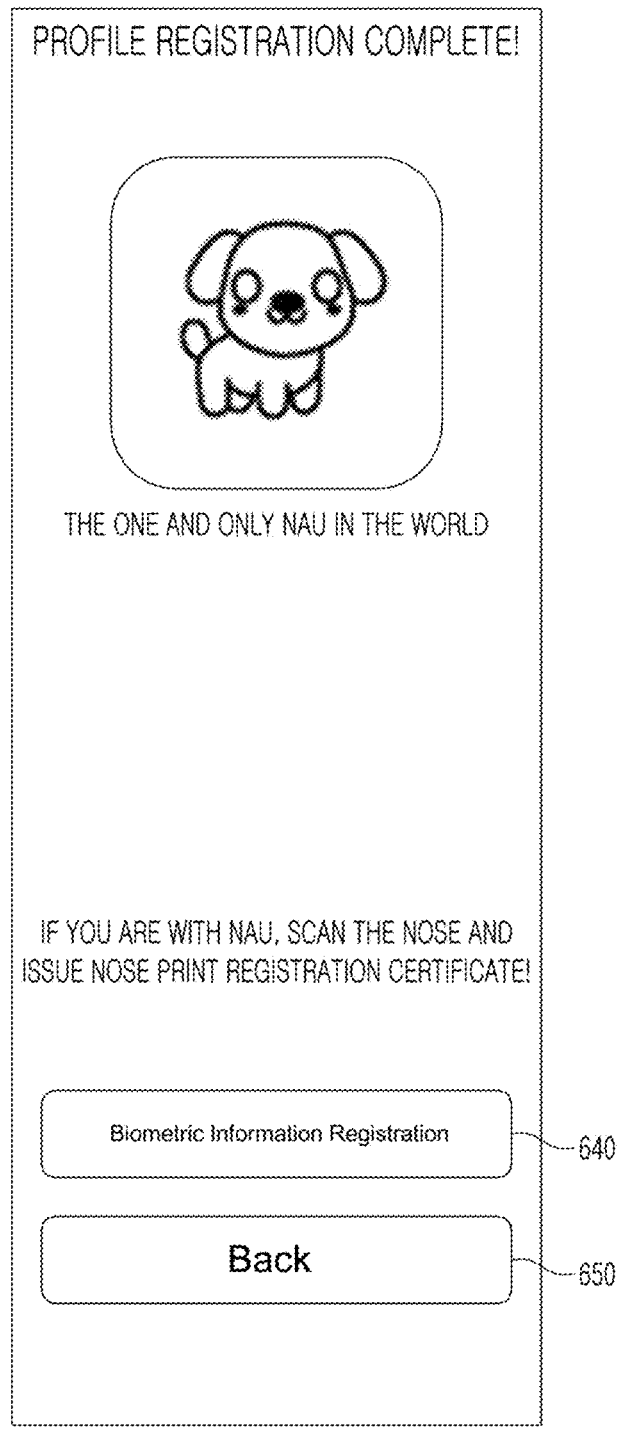
Figure 6C:
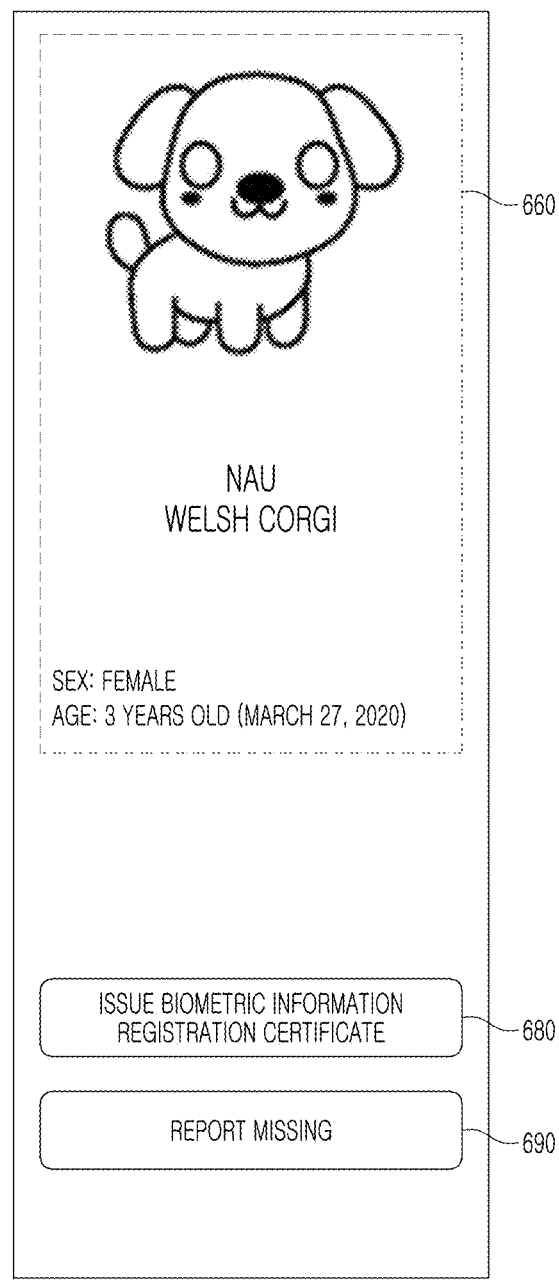
Figure 7A:
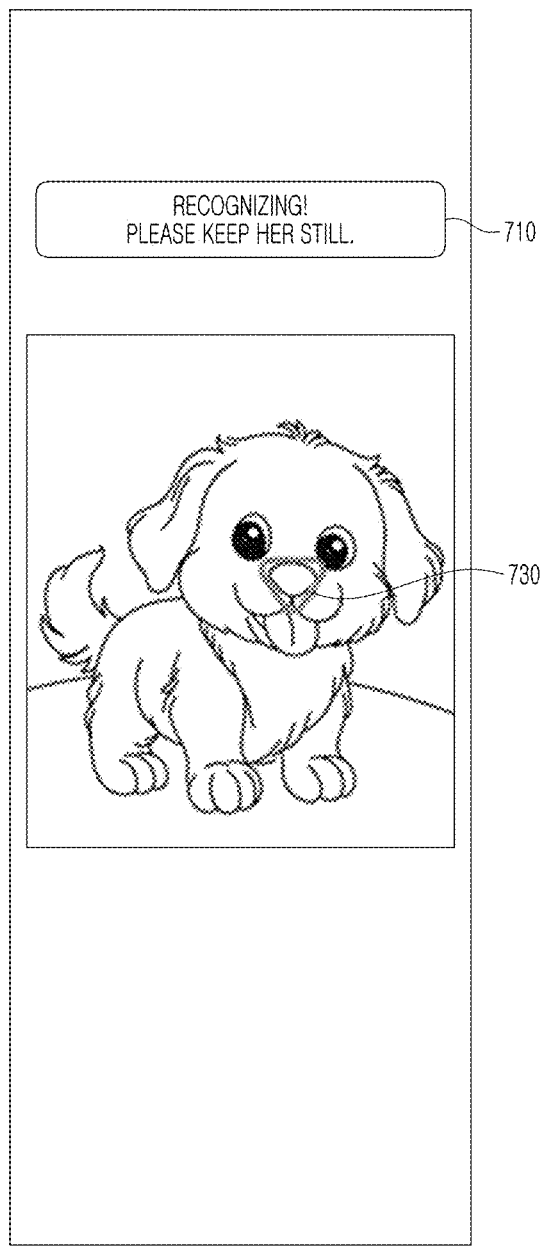
FIGS. 7A and 7B illustrate an example of screens displayed on a user device in a process of registering biometric information of a companion animal.
Figure 7B:
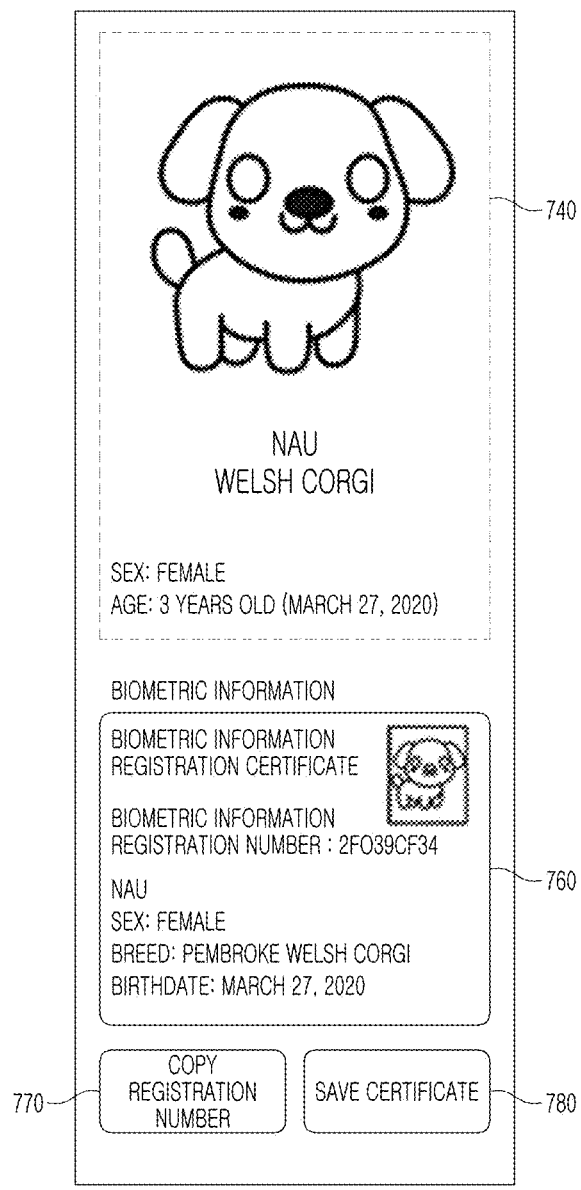

FIGS. 6A to 6C illustrate an example of screens displayed on a user device 200 in a process of registering profile information of a companion animal. FIGS. 7A and 7B illustrate an example of screens displayed on a user device 200 in a process of registering biometric information of a companion animal.

In FIG. 6A, a profile input interface for inputting profile information of a companion animal is displayed through a screen of the user device 200. In FIG. 6A, a profile picture 605, a name 610, breed information 615, a sex 620, a birthdate 625, and a profile input completion button 630 for completing the profile input are displayed through the profile input interface. Through the profile input interface like that shown in FIG. 6A, profile information of a companion animal may be input by a user. The profile information may include a breed, a sex, and a birthdate of the companion animal.

FIG. 6B illustrates a profile input completion interface indicating completion of profile input of a companion animal. FIG. 6B illustrates an interface displayed when the profile input completion button 630 for completing the profile input in FIG. 6A is pressed. In FIG. 6B, some information about a companion animal whose profile information has been input is displayed, and a biometric information registration button 640 for proceeding to an interface for generating a biometric information registration certificate and a return button 650 for returning to the initial screen are displayed. Upon an input to the biometric information registration button 640, an operation for acquiring the biometric information of the companion animal is executed in the user device 200. Upon an input to the return button 650, an operation for returning to the initial screen of the application for biometric authentication of a companion animal is executed.

FIG. 6C illustrates an interface displaying information about a companion animal whose profile has been registered in an application for biometric authentication of a companion animal. In FIG. 6C, profile information 660 of a companion animal is displayed. The profile information 660 includes information indicating whether biometric information of the companion animal is registered. When the biometric information is not registered, an issue biometric information registration certificate button 680 for proceeding to an interface for generating a biometric information registration certificate is displayed. Upon an input to the issue biometric information registration certificate button 680, an operation for acquiring the companion animal's biometric information is executed on the user device 200. In addition, a missing report button 690 for reporting a missing companion animal may be displayed on the interface.

FIG. 7A illustrates an interface displayed on a user device 200 in a process of registering biometric information of a companion animal. In order to acquire the biometric information, a camera of the user device 200 is activated, and a preview image captured by the camera is displayed on the screen. A message 710 indicating a capturing status of the companion animal and the preview image may be displayed in an overlapping fashion. In addition, at the location of a feature object corresponding to the biometric information of the companion animal, an icon 730 for tracking the corresponding feature object is displayed. The icon 730 may indicate the suitability of the current capturing status based on the image quality of the current feature object. While a screen such as FIG. 7A is displayed, the user may control the user device 200 such that an image suitable for biometric authentication of the companion animal is captured. For example, the user may move the user device 200 such that a frontal image of the companion animal is captured. The user device 200 may repeatedly evaluate whether an image suitable for biometric authentication is captured through a quality check on the preview image, and may automatically store an image having quality greater than or equal to a certain level. That is, the processor of the user device 200 may acquire an image suitable for biometric authentication of the companion animal by itself without the user needing to manually press a capturing button. The biometric information (e.g., a nose image) acquired through the process of acquiring biometric information may be transmitted to the authentication server 100 as the first biometric information. That is, the first biometric information includes an image including the face area or nose area of the companion animal.

When the acquisition of the biometric information is completed, the biometric information is transmitted to the authentication server 100, and the authentication server 100 stores the biometric information together with the profile information of the companion animal in the memory 150.

In operation S520, the processor 110 generates a biometric information registration certificate including a biometric information registration number of the companion animal based on the first biometric information and the profile information of the companion animal. The processor 110 generates the biometric information registration number of the companion animal, adds the biometric information registration number to registration information of the companion animal, and stores the biometric information registration number added to the registration information in the memory 150. The biometric information registration certificate may include a unique identification number of the companion animal. The biometric information registration certificate is data (an image file or a document file) that certifies the biometric information of the companion animal registered in the authentication server 100 in connection with identity information of the companion animal. The biometric information registration certificate may include a biometric information registration number, a breed, a sex, and a birthdate of the companion animal, and an issuance date. In operation S530, the processor 110 transmits the biometric information registration certificate to the user device 200 through the communication module 120.

FIG. 7B illustrates an interface displayed after biometric information registration is completed. In FIG. 7B, a biometric information registration certificate 760 is displayed together with profile information 740 of the companion animal. When biometric information registration is completed, the profile information 740 includes text indicating that biometric information registration is completed. The biometric information registration certificate 760 is data (an image file or a document file) that certifies that biometric information of the companion animal is registered in the authentication server 100 in connection with identity information of the companion animal. The interface may include a registration number copy button 770 for copying a registration number from the biometric information registration certificate 760 and a registration certificate save button 780 for storing the biometric information registration certificate 760 in the user device 200.

Figure 8:
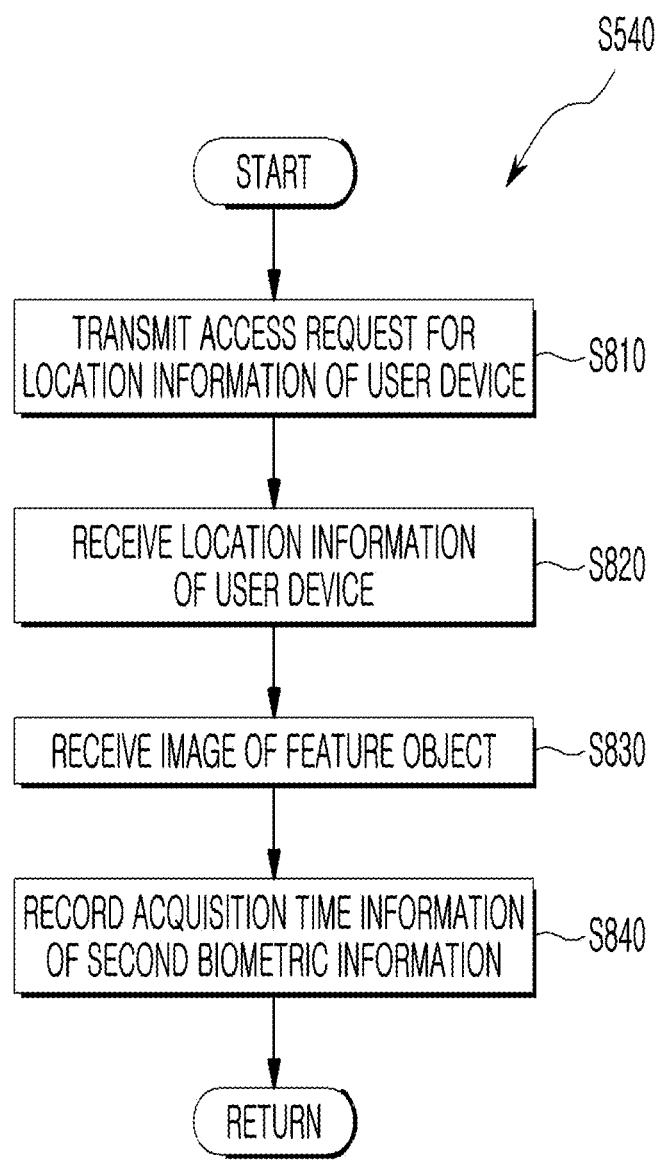
FIG. 8 is a flowchart showing a process of receiving a request for issuing a visit certificate.

In operation S540, the processor 110 receives authentication information of the companion animal acquired from the user device 200 and a request for issuing a visit certificate through the communication module 120. The authentication information of the companion animal includes second biometric information of the companion animal, location information of the user device 200, and acquisition time information of the second biometric information. FIG. 8 is a flowchart showing a process of receiving a request for issuing a visit certificate. Operation S540 of receiving a request for issuing a visit certificate includes transmitting an access request for location information of the user device 200 (S810), receiving the location information of the user device 200 when the access request is approved (S820), receiving an image of a feature object corresponding to the second biometric information from the user device 200 (S830), and recording a time at which the second biometric information is acquired as the acquisition time information of the second biometric information (S840).

Figure 9A:
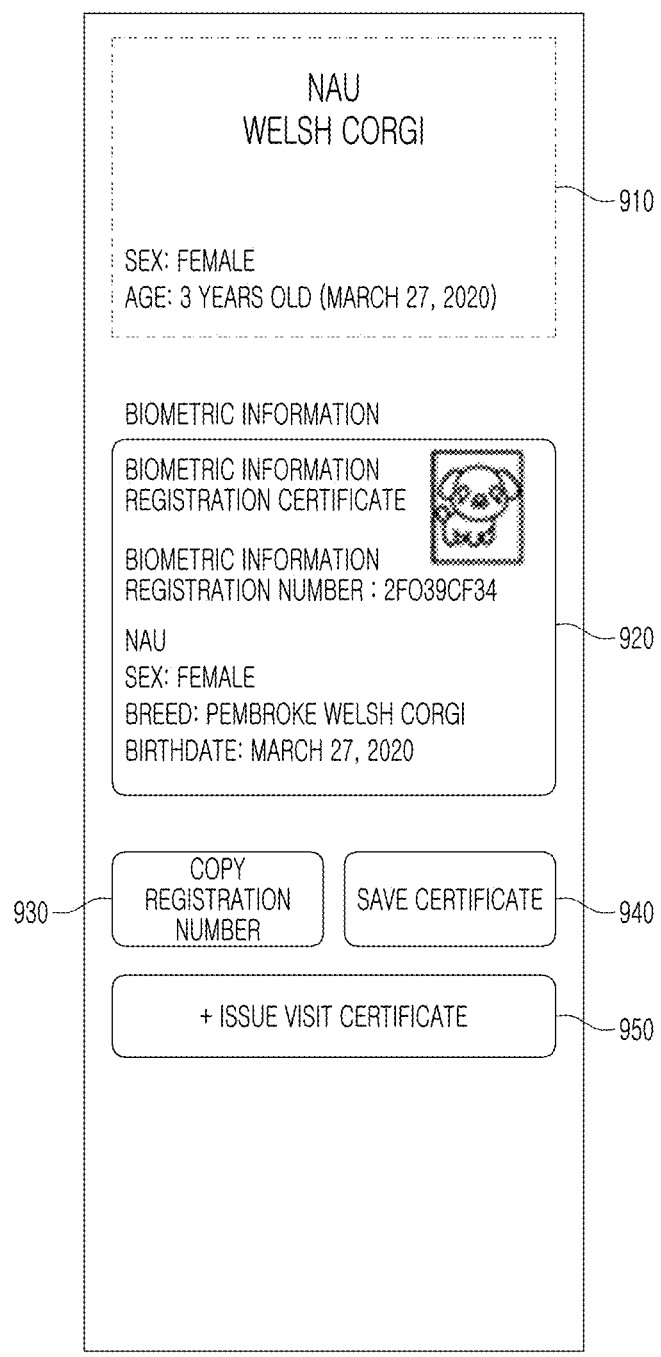
FIGS. 9A to 9C illustrate an example of screens displayed on a user device in an input process for requesting a visit certificate.
Figure 9B:
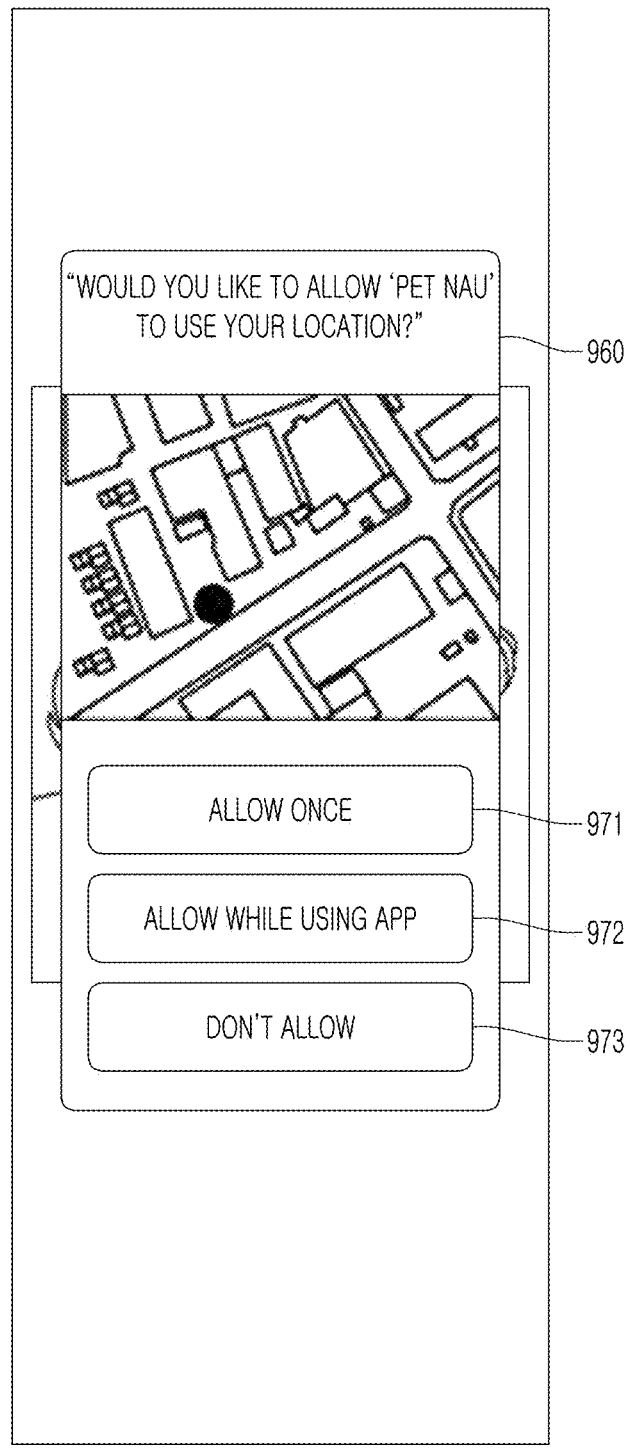
Figure 9C:
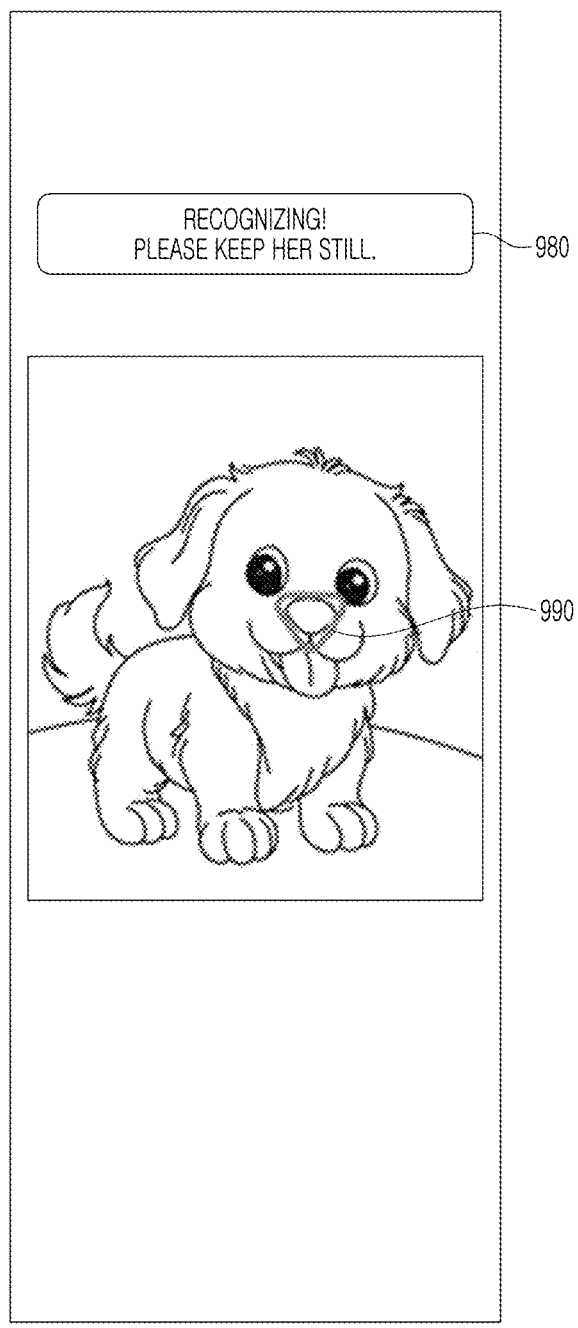

First, a request for issuing a visit certificate is generated from the user device 200 of an owner who has visited a pet facility. FIGS. 9A to 9C show an example of screens displayed on the user device 200 during an input process of requesting a visit certificate. FIG. 9A is a profile interface showing profile information of a companion animal. In FIG. 9A, profile information 910 of an animal, a biometric information registration certificate 920, a copy button 930 for copying a biometric information registration number to a clipboard, a save button 940 for saving the biometric information registration certificate to the memory of the user device 200, and an issuance request button 950 for generating a request for issuing a visit certificate are displayed. Upon an input to the issuance request button 950, a request for issuing a visit certificate is transmitted to the authentication server 100.

In operation S810, in response to the request for issuing a visit certificate, the processor 110 transmits a request for access to location information to the user device 200 through the communication module 120. When the request for access is transmitted to the user device 200, an interface for acquiring location information from the user device 200 is displayed as in FIG. 9B. FIG. 9B illustrates an interface for selecting whether to allow access to the location information of the user device 200 by the authentication server 100. In FIG. 9B, an interface 960 notifying of the occurrence of the request for access to location information by the authentication server 100 is displayed, and the interface 960 includes a one-time permission button 971 that allows one-time access, an in-app operation permission button 972 that allows access during use of the application, and a rejection button 973 that denies access.

In operation S820, upon an input to the one-time permission button 971 or the in-app operation permission button 972, the processor 110 receives the location information of the user device 200 through the communication module 120. Upon an input to the one-time permission button 971 or the in-app operation permission button 972, the location information is transmitted from the user device 200 to the authentication server 100. Upon an input to the rejection button 973, a location information access rejection message is transmitted from the user device 200 to the authentication server 100. When the access to the location information is denied, the authentication server 100 terminates the procedure for issuing a visit certificate.

In operation S830, the processor 110 receives second biometric information (an image of a feature object) from the user device 200 through the communication module 120. In FIG. 9B, upon an input to the one-time permission button 971 or the in-app operation permission button 972, the user device 200 executes an operation for acquiring biometric information of a companion animal. The user device 200 activates the camera to capture an image of a feature area (e.g., the face or the nose) as the biometric information of the companion animal. FIG. 9C illustrates an interface for acquiring biometric information of a companion animal, and a message 980 indicating a capturing status of the companion animal and an icon 990 for tracking a feature object are displayed together with a preview image captured by the camera. The acquisition of the second biometric information of the companion animal may be performed in the same manner as the acquisition of the first biometric information described with reference to FIG. 7A. An image including the nose print of the companion animal may be extracted as the second biometric information. The second biometric information may be transmitted from the user device 200 to the authentication server 100. In another embodiment, the user device 200 may transmit an image of the companion animal previously stored as the second biometric information to the authentication server 100.

In operation S840, the processor 110 records the time at which the second biometric information has been acquired as acquisition time information of the second biometric information. The processor 110 may store the time at which the second biometric information is received from the user device 200 in association with the location information of the user device 200 and the second biometric information of the companion animal in the memory 150. Alternatively, the time at which the second biometric information has been captured may be recorded as the acquisition time information of the second biometric information. Additionally, the authentication server 100 may receive facility visit information (facility information and visit time information) from the user device 200. When the authentication server 100 receives the location information of the user device 200, the biometric information of the companion animal, the acquisition time information, and the facility visit information from the user device 200, the authentication server 100 may proceed to operation S550 and execute an operation for generating a visit certificate.

Figure 10:
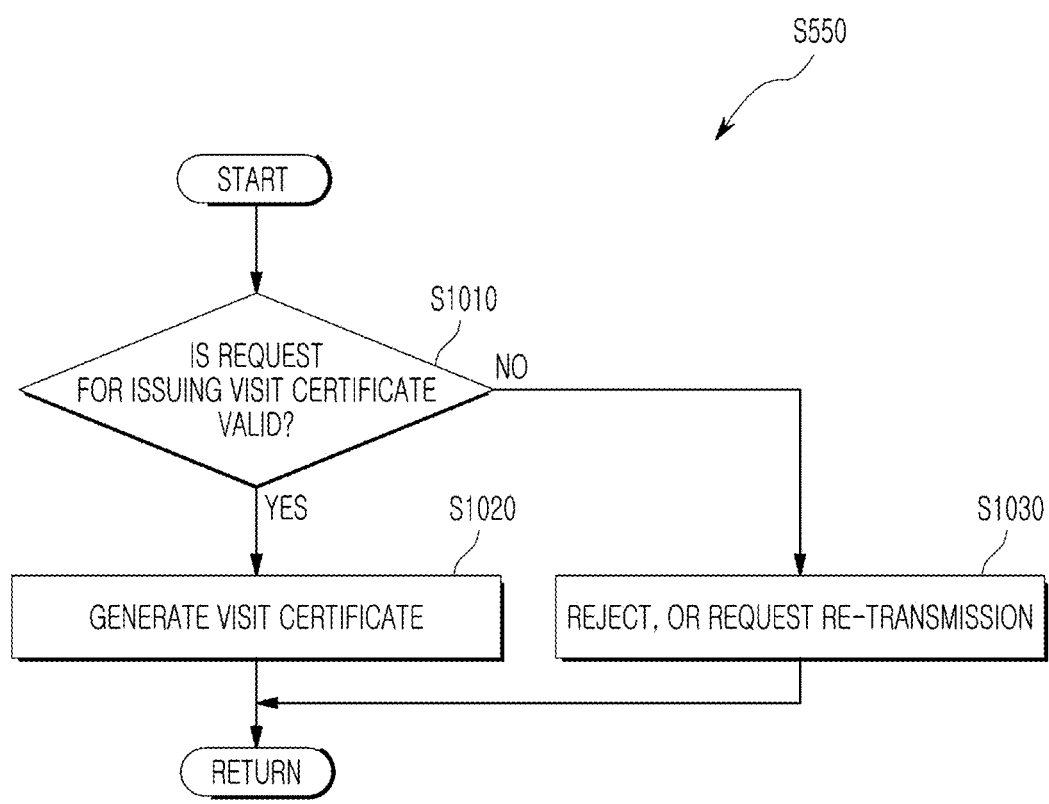
FIG. 10 is a flowchart showing a process of generating a visit certificate.

In operation S550, the processor 110 generates a visit certificate based on the second biometric information of the companion animal, the acquisition time information of the second biometric information, and the location information of the user device 200. FIG. 10 is a flowchart showing a process of generating a visit certificate. Operation S550 of generating a visit certificate includes verifying validity of the request for issuing the visit certificate based on the second biometric information of the companion animal and the location information of the user device 200 (S1010), and generating a visit certificate corresponding to the request for issuing the visit certificate when the request for issuing the visit certificate is determined to be valid (S1020). When the request for issuing the visit certificate is determined to be invalid, the authentication server 100 may perform an operation in which the authentication server 100 rejects the request for issuing the visit certificate or transmits a message requesting re-execution of the request for issuing the visit certificate to the user device 200 (S1080).

In operation S1010, the processor 110 verifies the validity of the request for issuing the visit certificate based on the second biometric information of the companion animal and the location information of the user device 200. The authentication server 100 may verify whether the companion animal included in the request for issuing the visit certificate transmitted by the user device 200 is the same as a previously registered companion animal and whether the companion animal has actually visited the facility.

Figure 11:
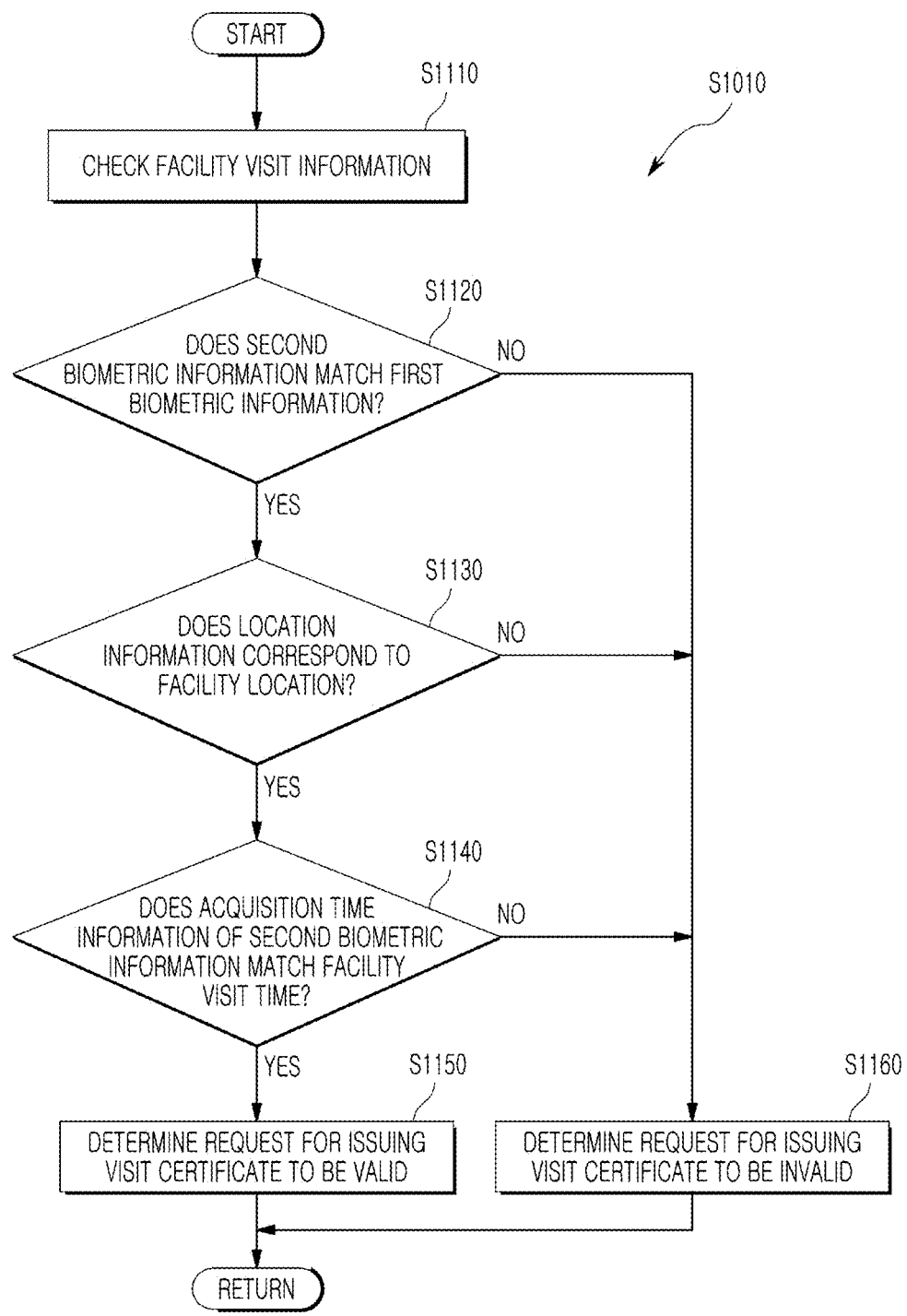
FIG. 11 is a flowchart showing a process of verifying the validity of a request for issuing a visit certificate.

FIG. 11 is a flowchart showing a process of verifying the validity of the request for issuing a visit certificate. Operation S1010 of verifying the validity of the request for issuing a visit certificate includes checking the facility visit information including the facility visit time and the facility information from the user device 200 (S1110), determining whether a first matching condition regarding whether the second biometric information matches the first biometric information is satisfied (S1120), determining whether a second matching condition regarding whether the location information of the user device 200 corresponds to the facility location is satisfied (S1130), determining whether a third matching condition regarding whether the acquisition time information of the second biometric information falls within a reference range from the facility visit time is satisfied (S1140), and determining that the request for issuing a visit certificate is valid when all of the first matching condition, the second matching condition, and the third matching condition are satisfied (S1150). When one of the first matching condition, the second matching condition, and the third matching condition is not satisfied, an operation of determining that the request for issuing a visit certificate is invalid may be executed (S1160).

In operation S1110, the processor 110 checks the facility visit information input by the user device 200. The facility visit information may be input to the user device 200 and transmitted to the authentication server 100. The facility visit information may include information about a visit facility, information about a visit time, and information about medical records.

In operation S1120, the processor 110 determines whether the first matching condition regarding whether the second biometric information matches the first biometric information is satisfied. The processor 110 determines, with respect to a companion animal for which the request for issuing a visit certificate has occurred, whether the first biometric information previously registered for the companion animal matches the second biometric information received from the user device 200. Whether the two pieces of biometric information match may be determined based on whether a value score indicating the degree of matching is greater than or equal to a reference value. Alternatively, the processor 110 may identify a companion animal that matches the second biometric information received from the user device 200 among companion animals for which biometric information has been previously registered. When the second biometric information of the companion animal matches the first biometric information (when the first matching condition is satisfied), operation S1130 may be executed.

In operation S1130, the processor 110 determines whether the second matching condition regarding whether the location information of the user device 200 corresponds to the facility location is satisfied. The processor 110 may determine whether the location information (e.g., coordinates and an address) of the user device 200 included in the request for issuing a visit certificate corresponds to the address of the facility. When the facility is included within a certain distance from the location information of the user device 200, the processor 110 may determine that the location information of the user device 200 corresponds to the facility location. When the location information of the user device 200 corresponds to the facility location (when the second matching condition is satisfied), operation S1140 may be executed.

In operation S1140, the processor 110 determines whether the third matching condition regarding whether the acquisition time information of the second biometric information matches the facility visit time is satisfied. The processor 110 determines whether the acquisition time of the second biometric information matches the facility visit time information included in the facility visit information received from the user device 200. For example, when the acquisition time of the second biometric information is included within a certain time range (e.g., 10 minutes) from the facility visit time, the processor 110 may determine that the acquisition time information of the second biometric information matches the facility visit time. As another example, the facility visit time information may be input as a certain time range in a certain interval (e.g., 30 minutes) e.g., from 10:30 to 11:00, and when the acquisition time of the second biometric information is included in the facility visit time information, the processor 110 may determine that the acquisition time information of the second biometric information matches the facility visit time. When the acquisition time information of the second biometric information matches the facility visit time (when the third matching condition is satisfied), operation S1150 may be executed.

In operation S1150, the processor 110 determines that the request for issuing a visit certificate is valid when the first matching condition, the second matching condition, and the third matching condition are all satisfied. When the request for issuing a visit certificate is determined to be valid, the processor 110 proceeds to operation S1020 of FIG. 10.

In operation S1020, when the request for issuing a visit certificate is determined to be valid, the processor 110 generates a visit certificate corresponding to the request for issuing a visit certificate. The visit certificate is data (an image file or a document file) certifying that a companion animal registered in an account of the user device 200 has visited a specific facility at a specific time. The visit certificate includes owner information of the companion animal, facility visit information of the companion animal, a biometric information registration certificate, and a quick response (QR) code corresponding to page information of the visit certificate. The owner information of the companion animal is information about an owner corresponding to the account of the user device 200 for which the request for issuing a visit certificate has occurred. The facility visit information includes a facility location and a facility visit time that are input into the user device 200 and then authenticated by the authentication server 100. The QR code is a code that allows easy access to a page on which the corresponding visit certificate may be checked from another device. In operation S560, the generated visit certificate is transmitted from the authentication server 100 to the user device 200. The authentication server 100 may store the visit certificate in the memory 150 of the authentication server 100 or in a separate database.

Figure 12A:
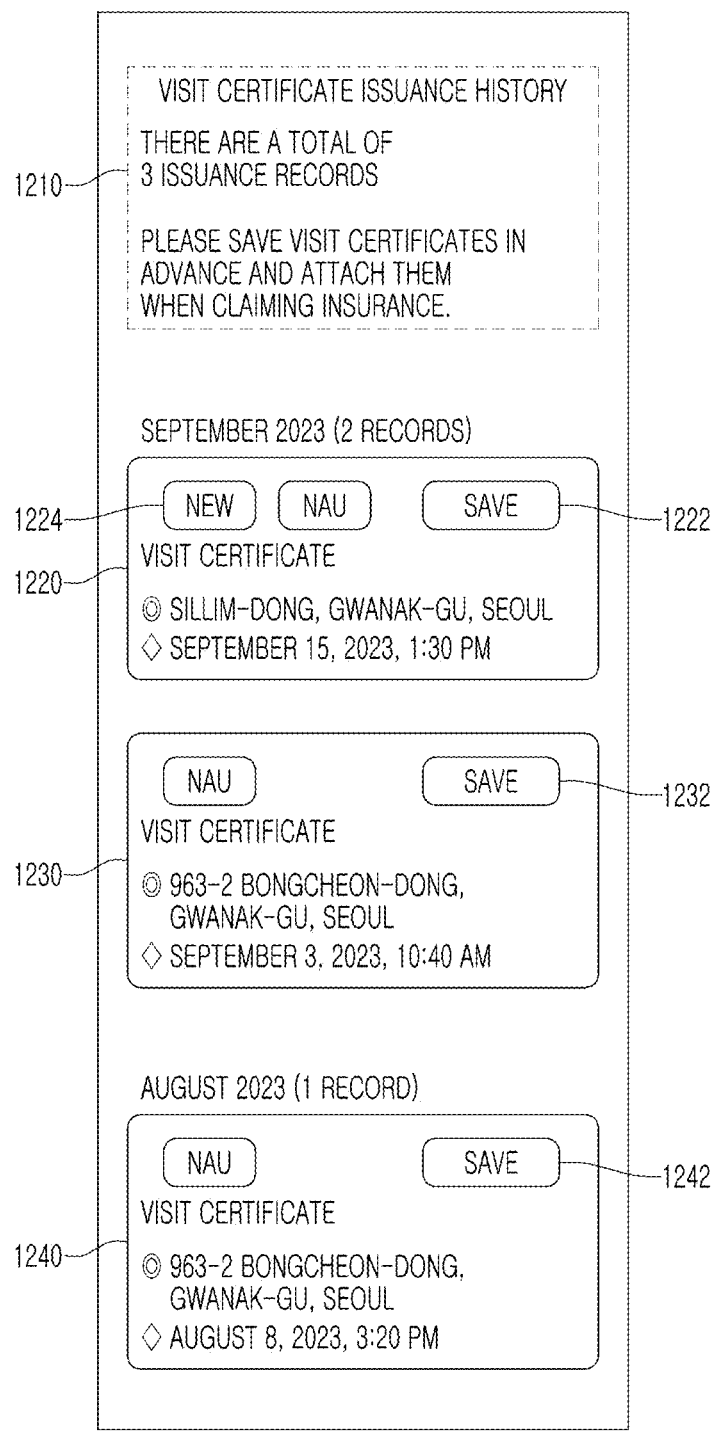
FIGS. 12A and 12B illustrate an example of screens displayed on a user device to which visit certificates have been issued.
Figure 12B:
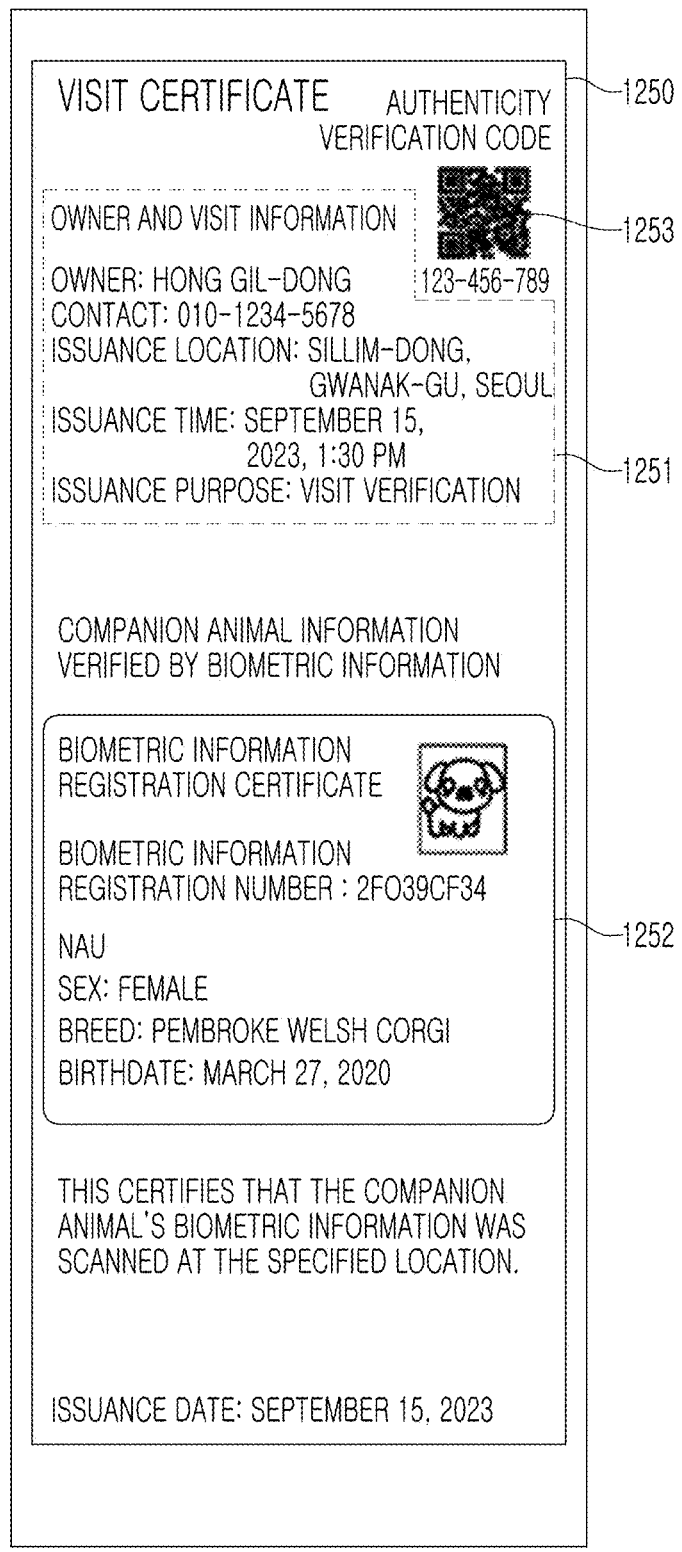

FIGS. 12A and 12B illustrate an example of screens displayed on a user device to which visit certificates have been issued. FIG. 12A illustrates an interface that outputs a list of visit certificates generated and registered by the authentication server 100. In FIG. 12A, a visit certificate issuance history 1210 and a list of visit certificates 1220, 1230, and 1240 for specific times are output. The list of the visit certificates 1220, 1230, and 1240 may include save buttons 1222, 1232, and 1242 for saving each visit certificate to the user device 200. The most recently issued visit certificate 1220 in the list may include an icon 1224 indicating a new issuance.

FIG. 12B illustrates an interface output when an input is made to a specific visit certificate 1220 in the list of FIG. 12A, and shows an example of a visit certificate 1250. The visit certificate 1250 includes owner information of a companion animal and facility visit information 1251, a biometric information registration certificate 1252, and a QR quick response code 1253 corresponding to page information of the visit certificate. The user may download the visit certificate to the user device 200 and attach the visit certificate when filing an insurance claim with the insurance company, and the insurance company may, when checking the insurance claim, verify through the visit certificate whether the companion animal for which the insurance claim has been made is a companion animal covered by the insurance and whether the companion animal has visited the facility at the time of the treatment. By establishing a system that allows verification of treatment between the owner of the companion animal and the insurance company as described above, the overall reliability of the pet insurance system may be improved.

FIG. 13 is a flowchart showing operations between a user device 200 and an authentication server 100 in a system for providing a service related to authentication of a companion animal. Referring to FIG. 13, the user device 200 receives first biometric information and profile information of a companion animal (S1305). The user device 200 transmits the first biometric information and the profile information of the companion animal to the authentication server 100 (S1310).

The authentication server 100 generates a biometric information registration certificate including a biometric information registration number of the companion animal based on the first biometric information and the profile information of the companion animal (S1315). The authentication server 100 transmits the biometric information registration certificate to the user device 200 (S1320)

The user device 200 receives an input for issuing a visit certificate (S1325). The user device 200 acquires second biometric information of the companion animal and location information of the user device 200 (S1330). The user device 200 transmits a request for issuing a visit certificate including the second biometric information of the companion animal and the location information of the user device 200 to the authentication server 100 (S1335).

The authentication server 100 generates the visit certificate based on the second biometric information of the companion animal, the acquisition time information of the second biometric information, and the location information of the user device (S1340), and transmits the visit certificate to the user device 200.

Figure 14:
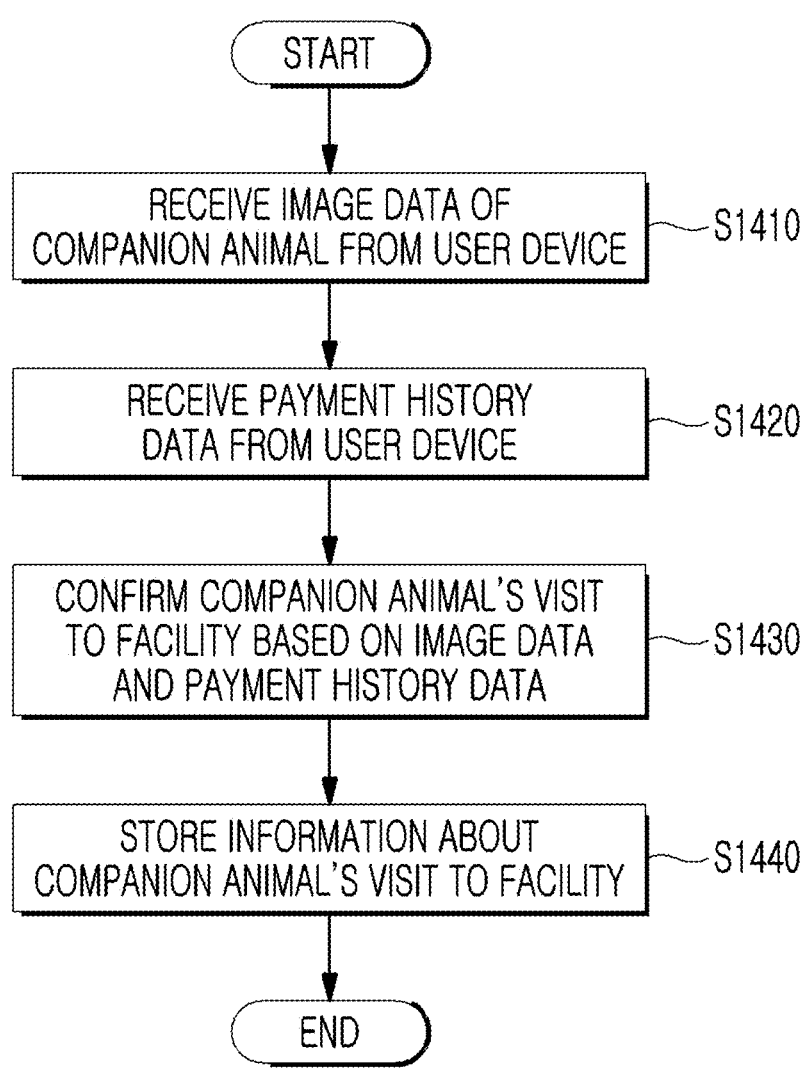
FIG. 14 is a flowchart illustrating an operation method of an authentication server according to a third embodiment in a system for providing a service related to authentication of a companion animal.

FIG. 14 is a flowchart showing an operation method of an authentication server 100 according to a third embodiment in a system for providing a service related to authentication of a companion animal. In this embodiment, the authentication server 100 uses payment history data together with image data generated by capturing an image of a companion animal to authenticate whether the companion animal has visited a facility.

Referring to FIG. 14, the operation method of the authentication server 100 in the system for providing a service related to authentication of a companion animal includes receiving image data of a companion animal from the user device 200 (S1410), receiving payment history data including payment information from the user device 200 (S1420), confirming a visit to a facility of the companion animal based on the image data and the payment history data (S1430), and storing information about the visit to the facility of the companion animal (S1440).

In operation S1410, the user device 200 transmits image data generated by capturing an image of a companion animal to the authentication server 100. The processor 110 receives the image data through the communication module 120. The image data may be an image including biometric information (e.g., a nose print and a face) of the companion animal. In other words, the image data may be a photo or video data generated in a process of acquiring the biometric information of the companion animal.

In operation S1420, the user device 200 transmits payment history data including payment information to the authentication server 100. The processor 110 receives the payment history data through the communication module 120. The payment history data may include a receipt photo or electronic receipt data on which payment information is recorded. The owner of the companion animal may capture a photo of a receipt, which is issued by visiting the facility, using the user device 200, and transmit the captured photo of the receipt to the authentication server 100. Alternatively, the owner of the companion animal may receive the electronic receipt data from the visited facility and transmit the electronic receipt data to the authentication server 100.

In operation S1430, the processor 110 may confirm a visit to the facility of the companion animal based on the image data and the payment history data.

Figure 15:
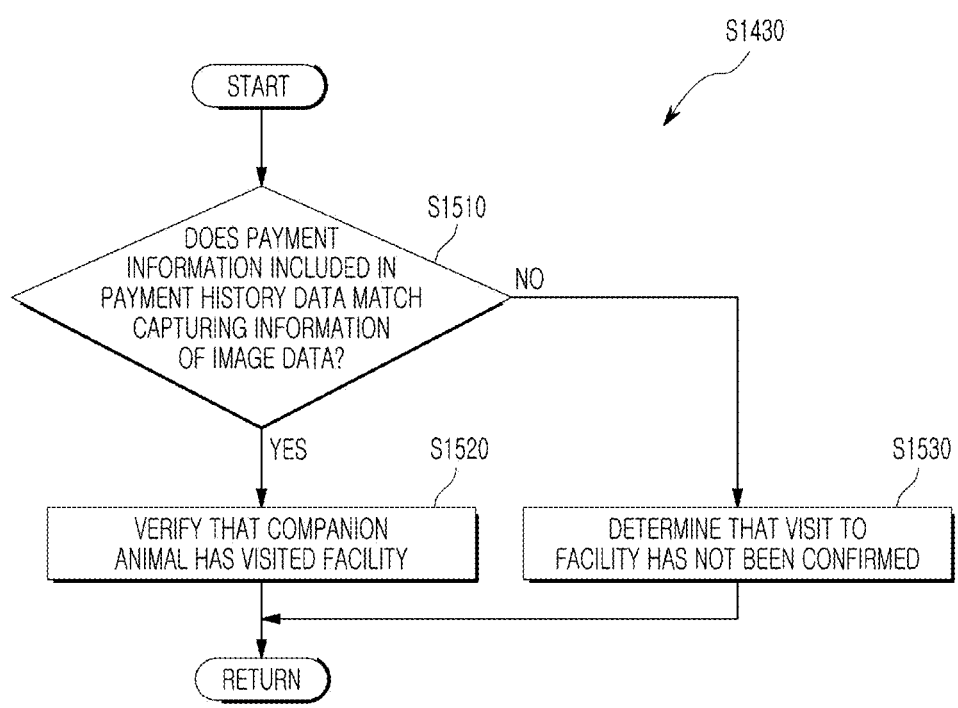
FIG. 15 is a flowchart showing a process of identifying whether a companion animal has visited a facility using image data of the companion animal and payment history data.

FIG. 15 is a flowchart showing a process of confirming whether a companion animal has visited a facility using image data of the companion animal and payment history data. Referring to FIG. 15, operation S1430 of confirming a visit to a facility of the companion animal includes determining whether payment information included in the payment history data matches capturing information of the image data (S1510), and when the payment information matches the capturing information, verifying that the companion animal has visited the facility. Operation S1430 of confirming a visit to a facility of the companion animal includes determining that a visit to the facility of the companion animal has not been confirmed when the payment information does not match the capturing information (S1530).

In operation S1510, the processor 110 confirms a visit to the facility of the companion animal based on the capturing information of the image data and the payment information included in the payment history data received from the user device 220.

Figure 16:
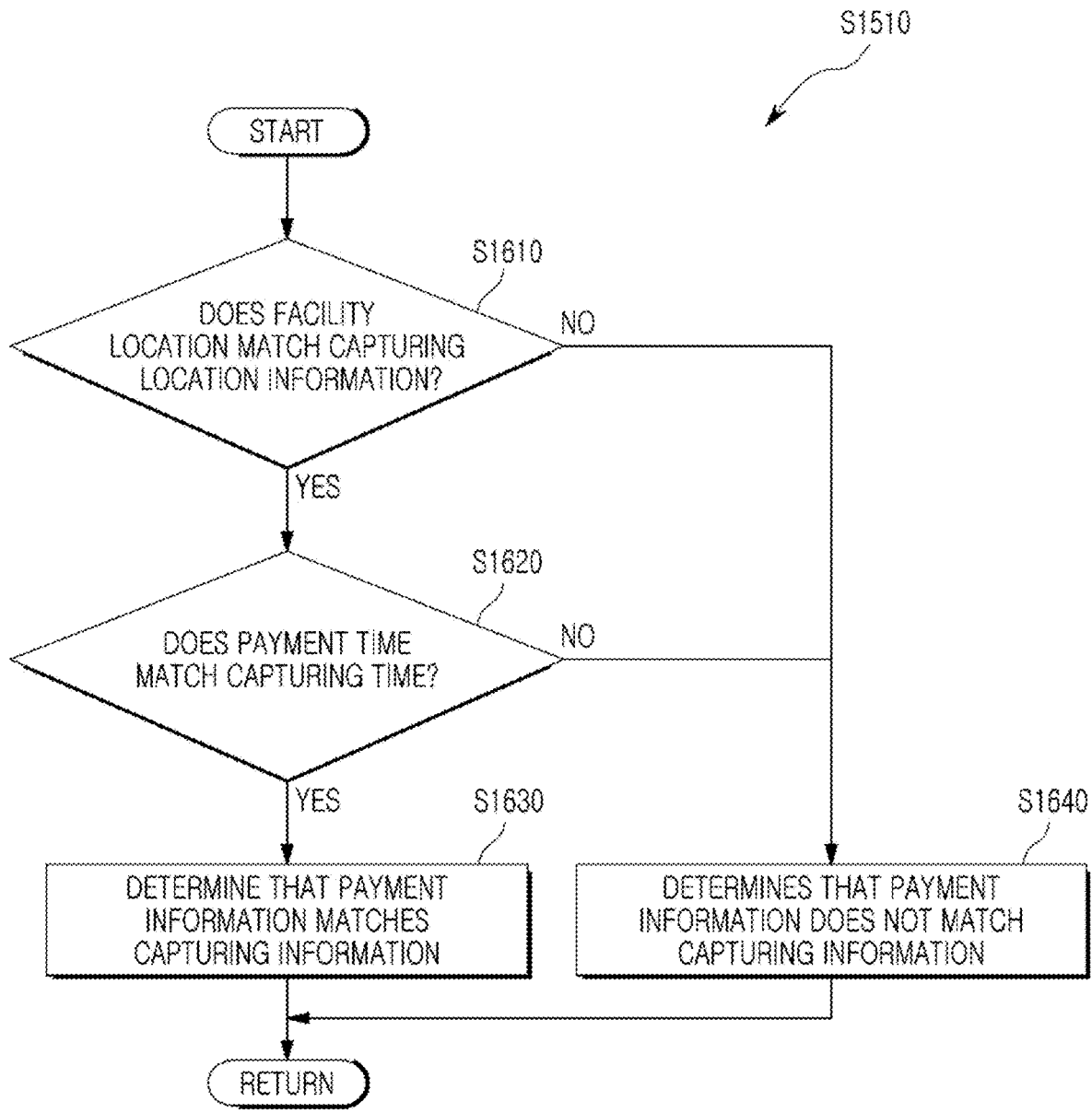
FIG. 16 is a flowchart showing a process of verifying whether payment information matches capturing information.

FIG. 16 is a flowchart showing a process of verifying whether payment information matches capturing information. Referring to FIG. 16, operation S1510 of determining whether payment information matches capturing information includes determining whether facility location included in the payment information matches capturing location information (S1610), and determining whether a payment time included in the payment information matches capturing time included in the capturing information (S1620).

Figure 17:
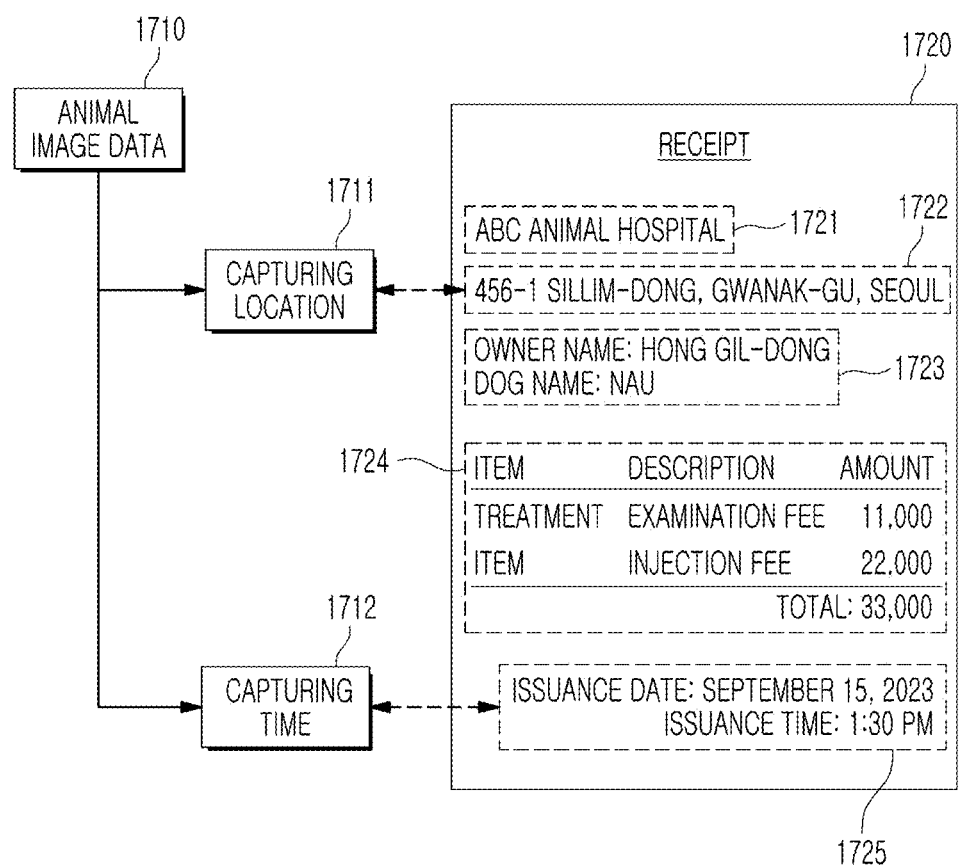
FIG. 17 is a diagram illustrating a process of correlating capturing information with payment information.

Prior to operation S1610, the processor 110 may extract capturing information from the image data and may extract payment information from the payment history data. For example, as illustrated in FIG. 17, the processor 110 may extract capturing information from metadata linked to the image data. The capturing information may include a capturing location 1711, a capturing time 1712, and a capturing format. Alternatively, the processor 110 may extract a capturing location and a capturing time based on an object detected in each frame of the image data. In addition, as illustrated in FIG. 17, the processor 110 may extract payment information, that is, a facility name 1721, a facility location 1722, visitor information 1723, payment information 1724, and a payment time 1725, from a receipt photo 1720.

In operation S1610, the processor 110 determines whether the facility information included in payment information matches the capturing location information. The processor 110 may determine whether the capturing location 1711 extracted from the image data 1710 matches the facility location 1722 of the payment information. The processor 110 may determine whether the capturing location 1711 is the same as the facility location 1722. Alternatively, the processor 110 may determine whether the distance between the capturing location 1711 and the facility location 1722 is within a reference range (e.g., 100 m). When the distance between the capturing location 1711 and the facility location 1722 is within the reference range, the processor 110 may determine that the capturing location 1711 matches the facility location 1722. The processor 110 may determine whether the capturing location 1711 is the same as the facility location 1722 by comparing the coordinates of the capturing location 1711 and the coordinates of the facility location 1722. When the capturing location 1711 matches the facility location 1722 of the facility information, the processor 110 proceeds to operation S1620. When the capturing location 1711 does not match the facility location 1722 of the facility information, the processor 110 proceeds to operation S1640 and determines that the payment information does not match the capturing information.

In operation S1620, the processor 110 determines whether a payment time included in payment information matches a capturing time included in capturing information. The processor 110 determines whether the capturing time 1712 extracted from the image data 1710 matches the payment time 1725 of the payment information. The processor 110 may determine whether the difference between the capturing time 1712 and the payment time 1725 is within a reference range (e.g., 10 minutes). When the difference is within the reference range, the processor 110 may determine that the capturing time 1712 matches the payment time 1725. When the capturing time 1712 matches the payment time 1725, the processor 110 proceeds to operation S1630 and determines that the payment information matches the capturing information. When the capturing time 1712 does not match the payment time 1725, the processor 110 proceeds to operation S1640 and determines that the payment information does not match the capturing information.

When it is determined that the payment information matches the capturing information, in operation S1520, the processor 110 verifies that the companion animal has visited the facility. In this case, the authentication server 100 may transmit, to the user device 200, a message notifying that a visit to the facility of the companion animal is authenticated.

When it is determined that the payment information does not match the capturing information, the processor 110 determines, in operation S1530, that a visit to the facility of the companion animal has not been confirmed. In this case, the processor 110 may transmit, to the user device 200, a message notifying that the visit has not been confirmed, or may request data re-transmission from the user device 200.

In operation S1440, the processor 110 may store information about the visit to the facility of the companion animal in the memory 150. The authentication server 100 may store the information about the visit to the facility of the companion animal in a separate database. The authentication server 100 may generate a visit certificate indicating information about the visit to the facility of the companion animal and store the visit certificate in the memory 150 or the database. Upon a request from the user device 200 or the insurance company 400, the authentication server 100 may transmit information about the visit to the facility of the companion animal to the user device 200 or the insurance company 400.

As is apparent from the above, a visit certificate is generated based on biometric information of a companion animal and location information of a user device, thereby verifying the identity of a companion animal and whether the companion animal has visited a facility.

The effects of the present disclosure are not limited to the effects described above, and other effects that are not described will be clearly understood by those skilled in the art from the following description.

Although various embodiments of the present invention have been described above, the present embodiments and the drawings attached to the present specification only clearly show a part of the technical idea included in the present invention, and it will be apparent that all modifications and specific embodiments that can be easily inferred by a person skilled in the art within the scope of the technical idea are included in the scope of the present invention.

Therefore, the spirit of the present invention is not defined by the above embodiments but by the appended claims of the present invention, and the scope of the present invention is to cover not only the following claims but also all modifications and equivalents derived from the claims.

What is claimed is:

1. An operation method of an authentication server in a system for providing a service related to authentication of a companion animal, the operation method comprising:
   receiving first biometric information and profile information of the companion animal from a user device;
   generating a biometric information registration certificate including a biometric information registration number of the companion animal based on the first biometric information and the profile information of the companion animal;
   transmitting the biometric information registration certificate to the user device;
   receiving authentication information of the companion animal acquired from the user device and a request for issuing a visit certificate from the user device;
   generating the visit certificate based on the authentication information of the companion animal; and
   transmitting the visit certificate to the user device,
   wherein the receiving of the request for issuing the visit certificate comprises:
   transmitting a request for access to location information of the user device;
   if the request for the access to the location information of the user device is approved, receiving the location information of the user device;
   receiving an image of a feature object corresponding to second biometric information from the user device; and
   recording a time at which the second biometric information is acquired as acquisition time information of the second biometric information.

2. The operation method of claim 1,
   wherein the authentication information of the companion animal includes the second biometric information of the companion animal, the acquisition time information of the second biometric information, and the location information of the user device.

3. The operation method of claim 1,
   wherein the generating of the visit certificate comprises:
   verifying validity of the request for issuing the visit certificate based on the second biometric information of the companion animal and the location information of the user device; and
   generating the visit certificate corresponding to the request for issuing the visit certificate when the request for issuing the visit certificate is determined to be valid.

4. The operation method of claim 3,
   wherein the verifying of the validity of the request for issuing the visit certificate includes:

checking facility visit information including a facility visit time and facility information from the user device;

determining whether a first matching condition regarding whether the second biometric information matches the first biometric information is satisfied;

determining whether a second matching condition regarding whether the location information of the user device corresponds to a facility location is satisfied;

determining whether a third matching condition regarding whether the acquisition time information of the second biometric information falls within a reference range from the facility visit time is satisfied; and determining that the request for issuing the visit certificate is valid when all of the first matching condition, the second matching condition, and the third matching condition are satisfied.

5. An operation method of an authentication server in a system for providing a service related to authentication of a companion animal, the operation method comprising:

receiving image data of the companion animal from a user device;

receiving payment history data including payment information from the user device;

confirming a visit to a facility of the companion animal based on the image data and the payment history data; and storing information about the visit to the facility of the companion animal, wherein the confirming of the visit to the facility of the companion animal includes:

determining whether the payment information included in the payment history data matches capturing information of the image data; and verifying that the companion animal has visited the facility when the payment information matches the capturing information.

6. The operation method of claim 5, wherein the determining of whether the payment information matches the capturing information includes:

determining whether a facility location included in the payment information matches capturing location information; and determining whether a payment time included in the payment information matches a capturing time included in the capturing information.

7. The operation method of claim 6, wherein the capturing location information is acquired from metadata linked to the image data or extracted from an object included in a frame image of the image data.

* * * * *